US009955187B2

(12) United States Patent
Park et al.

(10) Patent No.: US 9,955,187 B2
(45) Date of Patent: Apr. 24, 2018

(54) METHOD AND APPARATUS FOR ENCODING OF VIDEO USING DEPTH INFORMATION

(71) Applicant: University-Industry Cooperation Group of Kyung Hee University, Yongin-si, Gyeonggi-do (KR)

(72) Inventors: Gwang Hoon Park, Seongnam-si (KR); Tae Wook Kim, Suwon-si (KR); Yoon Jin Lee, Yongin-si (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 362 days.

(21) Appl. No.: 14/631,342

(22) Filed: Feb. 25, 2015

(65) Prior Publication Data
US 2015/0281735 A1    Oct. 1, 2015

(30) Foreign Application Priority Data

Mar. 28, 2014  (KR) .................. 10-2014-0037276
May 16, 2014   (KR) .................. 10-2014-0059064

(51) Int. Cl.
| H04B 1/66 | (2006.01) |
| H04N 7/12 | (2006.01) |
| H04N 11/02 | (2006.01) |
| H04N 11/04 | (2006.01) |
| H04N 19/597 | (2014.01) |
| H04N 19/57 | (2014.01) |

(52) U.S. Cl.
CPC .......... *H04N 19/597* (2014.11); *H04N 19/57* (2014.11)

(58) Field of Classification Search
CPC .................... H04N 19/119; H04N 19/96
See application file for complete search history.

(56) References Cited

U.S. PATENT DOCUMENTS

| 9,369,736 B2 * | 6/2016 | Choi .............. H04N 19/61 |
| 2011/0176615 A1 * | 7/2011 | Lee ............... H04N 19/52 |
| | | 375/240.16 |

(Continued)

FOREIGN PATENT DOCUMENTS

| KR | 10-2012-0137305 A | 12/2012 |
| KR | 10-2014-0008984 A | 1/2014 |

(Continued)

OTHER PUBLICATIONS

Morvan et al "Platelet-based coding of depth maps for the transmission of multiview images." Proceedings of SPIE, Stereoscopic Displays and Applications. vol. 6055. 2006.*

(Continued)

*Primary Examiner* — Tat C Chio
*Assistant Examiner* — Fabio S Lima
(74) *Attorney, Agent, or Firm* — Sughrue Mion, PLLC

(57) ABSTRACT

A method of encoding an image using a depth information includes: extracting a depth value distribution information of a current largest coding unit (LCU); predicting a plurality of division structure candidates of the LCU based on the depth value distribution information; and determining an optimum division structure among the plurality of division structure candidates of the LCU based on at least one of coding efficiency and image quality.

8 Claims, 24 Drawing Sheets

(56) References Cited

U.S. PATENT DOCUMENTS

| | | | | |
|---|---|---|---|---|
| 2014/0064567 A1* | 3/2014 | Kim | ................... | G06T 7/2086 |
| | | | | 382/107 |
| 2014/0085416 A1* | 3/2014 | Chang | ................ | H04N 13/0048 |
| | | | | 348/43 |
| 2015/0036926 A1* | 2/2015 | Choi | ................... | G06T 5/003 |
| | | | | 382/167 |
| 2015/0086124 A1* | 3/2015 | Song | ................... | H04N 19/176 |
| | | | | 382/233 |
| 2015/0172714 A1* | 6/2015 | Wu | ................... | H04N 19/597 |
| | | | | 375/240.12 |
| 2015/0296197 A1* | 10/2015 | Paark | ................ | H04N 13/0048 |
| | | | | 382/154 |
| 2015/0381980 A1* | 12/2015 | Tsuchiya | .............. | H04N 19/176 |
| | | | | 375/240.02 |

FOREIGN PATENT DOCUMENTS

| | | |
|---|---|---|
| KR | 10-2014-0048784 A | 4/2014 |
| WO | 2013/023005 A1 | 2/2013 |

OTHER PUBLICATIONS

Bae, Dong In, "HEVC Encoder Optimization Using Depth Information," Dept. of Computer Engineering, Kyung Hee University Graduate School, Feb. 28, 2013.

Korean Notice of Allowance for corresponding Application No. 10-2014-0059064.

* cited by examiner

METHOD AND APPARATUS FOR ENCODING OF VIDEO USING DEPTH INFORMATION

CROSS-REFERENCE TO RELATED APPLICATION

This application claims the benefit under 35 U.S.C. § 119(a) of Korean Patent Application No. 10-2014-0059064, filed on May 16, 2014, and No. 10-2014-0037276, filed Mar. 28, 2014, in the Korean Intellectual Property Office, which are incorporated herein by reference in their entirety.

BACKGROUND

1. Technical Field

The present disclosure relates to an encoding of a video using a depth information, and more particularly, to a method and an apparatus of inducing an object information and efficiently encoding an image using a depth information.

2. Discussion of the Related Art

A depth information image has been widely used in an encoding of a three-dimensional video, and a depth information camera of a new input device such as a Kinect camera of an Xbox game machine, an Intel SENZ3D webcam, an iSense 3D scanner of an iPad and a Google Tango Smartphone may be used for various 3D and 2D applications.

In addition, 2D/3D application has been popularized through various 2D/3D services due to popularization and dissemination of the depth information camera. As a result, a future multimedia camera system may include the depth information camera to utilize a variety of information.

Patent documents of the prior art documents are as follows: (patent document 1) US 2014/0085416 (Title of the Invention: METHOD AND APPARATUS OF TEXTURE IMAGE COMPRESS IN 3D VIDEO CODING); (patent document 2) KR 10-2012-0137305 (Title of the Invention: METHOD OF DIVIDING BLOCKS AND APPARATUS USING THE SAME); and (patent document 3) KR 10-2014-0048784 (Title of the Invention: METHOD AND APPARATUS OF INDUCING MOTION INFORMATION BY SHARING RESTRICTIVE DEPTH INFORMATION VALUE).

SUMMARY

Embodiments of the present disclosure relate to a method and apparatus of encoding a video using a depth information. Accordingly, one exemplary embodiment is directed to a method for encoding a video that substantially obviates one or more of the problems due to limitations and disadvantages of the related art.

One exemplary embodiment is a method and an apparatus of encoding a video where deterioration in performance is prevented and efficient encoding is obtained by using a depth information when a two-dimensional video is encoded.

Advantages and features of the disclosure will be set forth in part in the description, which follows and in part will become apparent to those having ordinary skill in the art upon examination of the following or may be learned from practice of the disclosure. Other advantages and features of the embodiments herein may be realized and attained by the structure particularly pointed out in the written description and claims hereof as well as the appended drawings.

To achieve other advantages and features in accordance with the purpose according to one aspect of the disclosure, a method of encoding an image using a depth information according to an embodiment includes: extracting a depth value distribution information of a current largest coding unit (LCU); predicting a plurality of division structure candidates of the LCU based on the depth value distribution information; and determining an optimum division structure among the plurality of division structure candidates of the LCU based on at least one of coding efficiency and image quality.

A method of encoding an image using a depth information according to another embodiment: extracting a depth value distribution information of a current largest coding unit (LCU); predicting an object structure of a CU included in the LCU based on the depth value distribution information of the CU; and determining an optimum division structure among a plurality of division structure candidates of the LCU by omitting a part of rate-distortion cost calculations based on prediction of the object structure of the CU.

A method of encoding an image using a depth information according to another embodiment includes: extracting a depth value distribution information of a current coding unit (CU) from a depth image; and verifying whether the current CU is formed of a single object or not based on the depth value distribution information and predicting a division structure of the current CU according to whether the current CU is formed of the single object.

An apparatus of encoding an image using a depth information according to another embodiment includes: a depth value extraction portion configured to extract a depth value distribution information of a current largest coding unit (LCU) from a depth image; a division structure prediction portion configured to predict a plurality of division structure candidates of the LCU based on the depth value distribution information; and an optimum division structure determination portion configured to determine an optimum division structure among the plurality of division structure candidates of the LCU based on at least one of coding efficiency and image quality.

An apparatus of encoding an image using a depth information according to another embodiment includes: a depth value extraction portion configured to extract a depth value distribution information of a current largest coding unit (LCU) from a depth image; a division structure prediction portion configured to predict an object structure of a CU included in the LCU based on the depth value distribution information of the CU; and an optimum division structure determination portion configured to determine an optimum division structure among a plurality of division structure candidates of the LCU by omitting a part of rate-distortion cost calculations based on prediction of the object structure of the CU.

An apparatus of encoding an image using a depth information according to another embodiment includes: a depth value extraction portion configured to extract a depth value distribution information of a current largest coding unit (CU) from a depth image; and a division structure prediction portion configured to verify whether the current CU is formed of a single object or not based on the depth value distribution information and predict a division structure of the current CU according to whether the current CU is formed of the single object.

It is to be understood that both the foregoing general description and the following detailed description are exemplary and explanatory, and are intended to provide further explanation of the embodiments as claimed.

BRIEF DESCRIPTION OF THE DRAWINGS

The accompanying drawings, which are included to provide a further understanding of the disclosure, are incorporated in and constitute a part of this specification, illustrate implementations of the disclosure and together with the description serve to explain the principles of embodiments of the disclosure.

FIG. 19 is a view showing examples of a depth value distribution of a CU.

DETAILED DESCRIPTION

Figure 1:
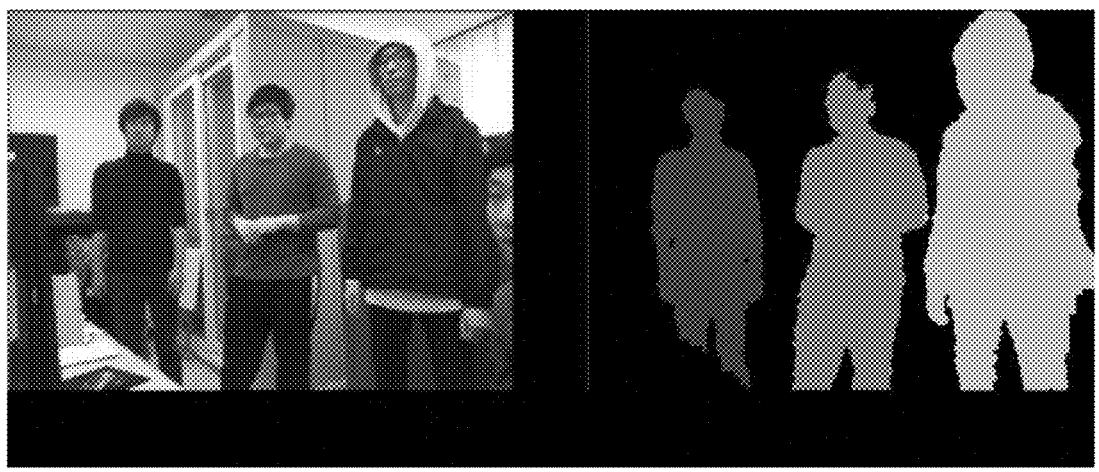
FIG. 1 is an exemplary view showing a general image and a depth information map of a general image.

Reference will now be made in detail to embodiments of the present disclosure, examples of which are illustrated in the accompanying drawings. In the following description, when a detailed description of well-known functions or configurations related to this document is determined to unnecessarily cloud a gist of an embodiment of the disclosure, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

Figure 2:
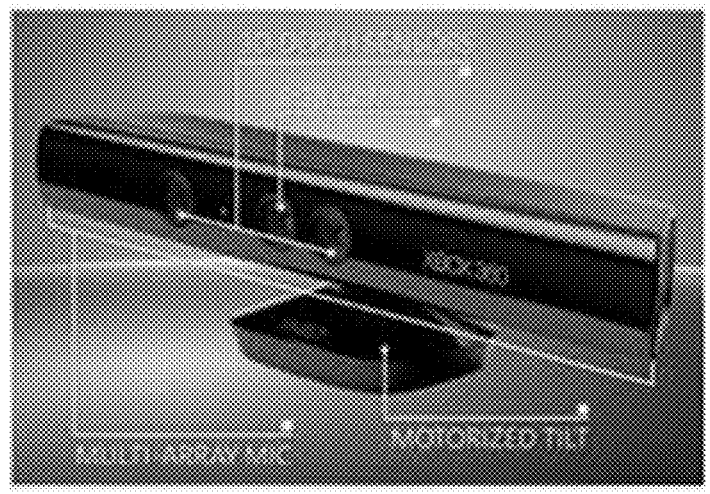
FIG. 2 is an exemplary view showing a Kinect input device.

FIG. 1 is an exemplary view showing a general image and a depth information map of a general image, and FIG. 2 is an exemplary view showing a Kinect input device.

In FIG. 1, the left view shows a real image taken by a camera, and the right view shows a depth image of a real image, i.e. a depth information image (or a depth information map). The depth information means an information of a real distance between the camera and the object.

The depth information image is mostly used for generating a three-dimensional virtual viewpoint image. A standardization of a three-dimensional video as a relating research is now progressing in the JCT-3V (Joint Collaborative Team on 3D Video Extension Development), which is a joint standardization group of the MPEG (Moving Picture Experts Group) of ISO/IEC and the VCTE (Video Coding Experts Group) of ITU-T.

The standard of a three-dimensional video includes a progressed data format, which can support play of an autostereoscopic image as well as a stereoscopic image using a general image and a depth information image thereof, and a standard for the relating technology.

The Microsoft launched the Kinect sensor as a new input device for the XBOX-360 game machine in the November of 2010. In FIG. 2, the Kinect input device perceives and transmits a movement of a person to a computer system and includes a 3D depth sensor as well as an RGB camera. In addition, the Kinect input device generates and provides an RGB image and a depth information map (a depth map) up to 640×480 to the connected computer system. In year 2014, further, the Intel presented 720p CREATIVE SENZ3D webcam having a depth sensor of 320×240 for a notebook computer, the Apple launched an iSense as a 3D scanner for an iPad using an RGB camera and a depth sensor, and the Google presented a Tango Smartphone having a depth sensor.

Figure 3:
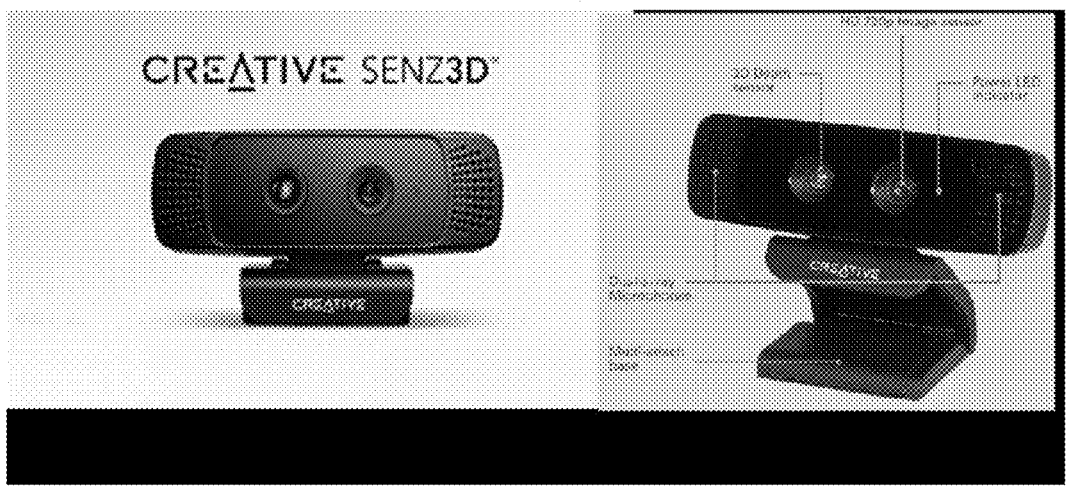
FIG. 3 is a view showing a CREATIVE SENZ3D webcam.

FIG. 3 is a view showing a CREATIVE SENZ3D webcam.

In FIG. 3, the left view shows a product of the SENZ3D webcam, and the right view shows a prototype of the SENZ3D webcam.

Figure 4:
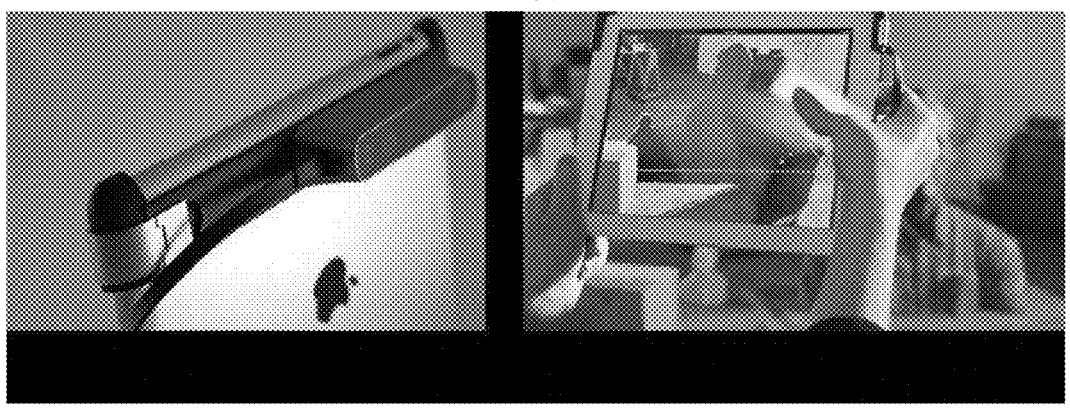
FIG. 4 is a view showing an iSense 3D scanner device.
Figure 5:
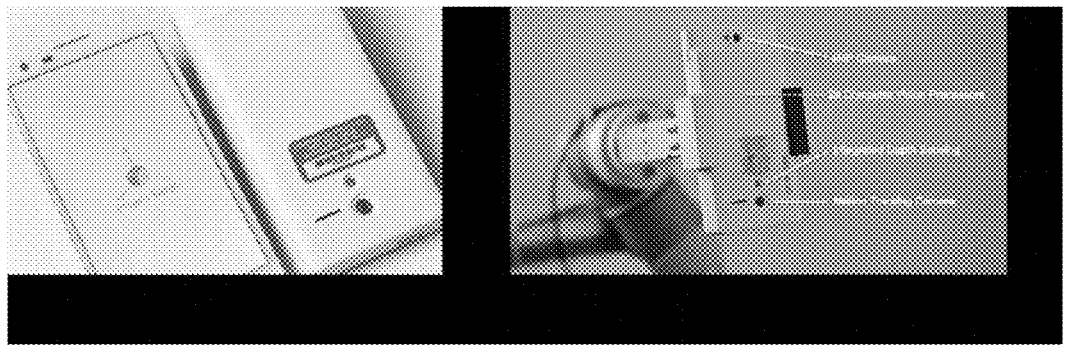
FIG. 5 is a view showing a Google Tango Smartphone.

FIG. 4 is a view showing an iSense 3D scanner device, and FIG. 5 is a view showing a Google Tango Smartphone.

In FIG. 4, the left view shows a product of the iSense, and the right view shows a scanning treatment through the iSense. In FIG. 5, the left view shows a product of the Google Tango Smartphone, and the right view shows a prototype of the Google Tango Smartphone.

The advent of an image device such as the Kinect, the iSense 3D scanner, the Intel SENZ3D webcam and the Google Tango Smartphone serves as a momentum for a public enjoyment of various applications such as two-dimensional and three-dimensional games or an image service and shows that a video device having a depth information camera or sensor becomes popular.

It is forecast that the video system is developed as a device where a general image camera is combined with a depth camera for basically supplying a two-dimensional and three-dimensional application image service as well as a two-dimensional general image service or an assist device in a handheld system.

The video system, where the general image camera and the depth camera are basically combined, is new method using the depth information in a three-dimensional video codec as well as a two-dimensional video codec.

In addition, encoding of a general image is performed by using a typical video codec intactly in the camera system including the depth information camera. For example, the typical video codec may include MPEG-1, MPEG-2, MPEG-4, H.261, H.262, H.263, H.264/AVC, MVC, SVC, HEVC, SHVC, 3D-AVC, 3D-HEVC, VC-1, VC-2 and VC-3, and the general image may be encoded by using the other various codecs.

Figure 6:
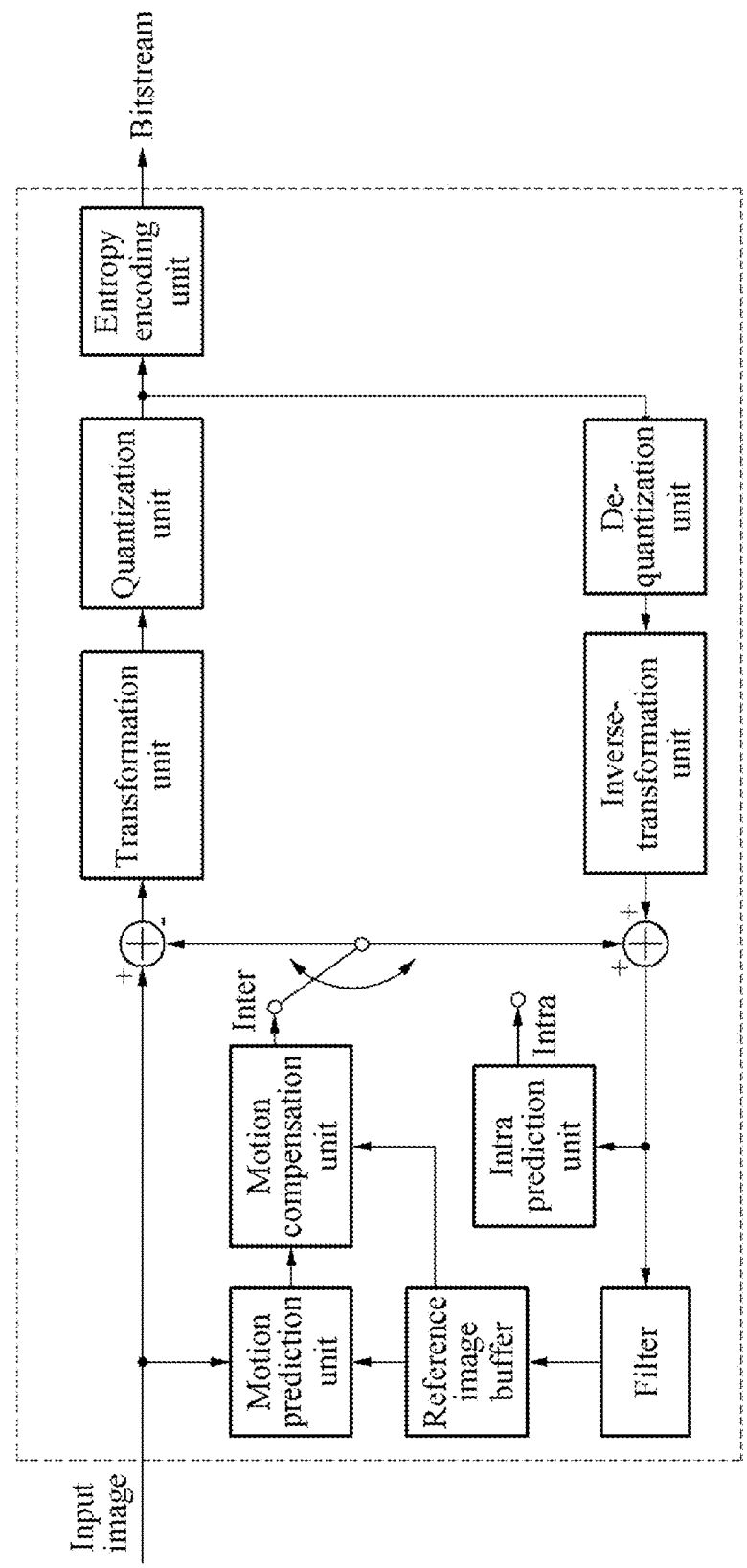
FIG. 6 is a view showing an encoding apparatus using HEVC.

FIG. 6 is a view showing an encoding apparatus using HEVC.

As an exemplary method of encoding a real image and a depth information map thereof, encoding may be performed by using HEVC (High Efficiency Video Coding) where standardization is completed jointly in MPEG (Moving Picture Experts Group) and VCEG (Video Coding Experts Group) having a maximum coding efficiency among video coding standards that have been developed up to the present. The HEVC includes various algorithms such as a unit and a structure of encoding, an inter prediction between images, an intra prediction in an image, an interpolation, a filtering and a transformation. FIG. 6 shows an example of a structure of an image encoding apparatus using the HEVC.

In FIG. 6, a SAO (Sample Adaptive Offset) may be disposed between a filter and a reference image buffer. The SAO may add an optimum offset value to a pixel value for compensate a coding error.

Since the HEVC performs an inter prediction encoding, i.e. a prediction encoding between images, it is necessary to decode and store the current encoded image for using as a reference image. Accordingly, a quantized coefficient is de-quantized in a de-quantization unit and is inversely transformed in an inverse-transformation unit. A de-quantized and inversely-transformed coefficient is added to a prediction block by an adder and a restoration block is generated. The restoration block through the filter is stored in the reference image buffer.

Figure 7:
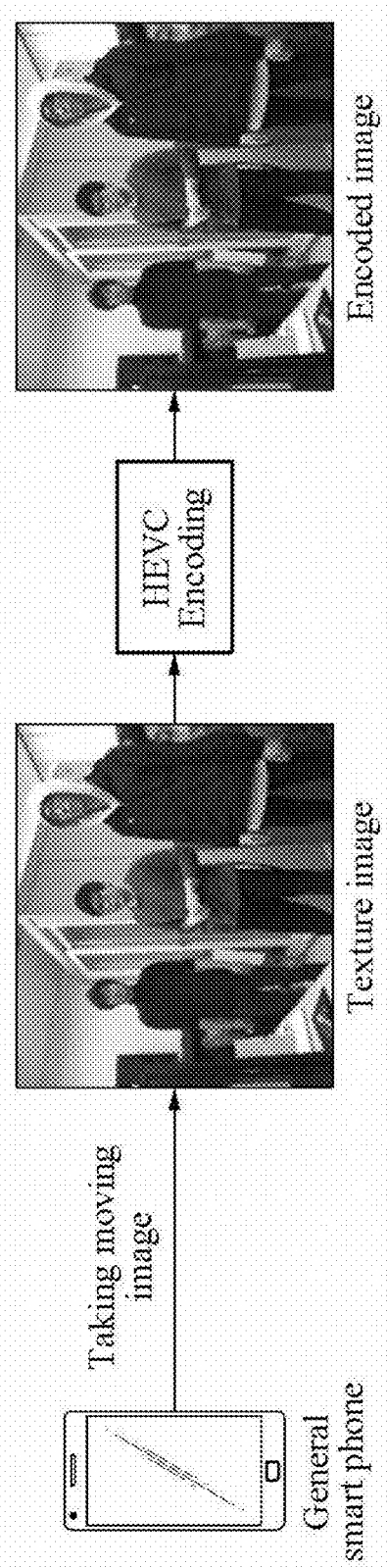
FIG. 7 is a view showing an exemplary encoding of an image by HEVC in a smart phone.
Figure 8:
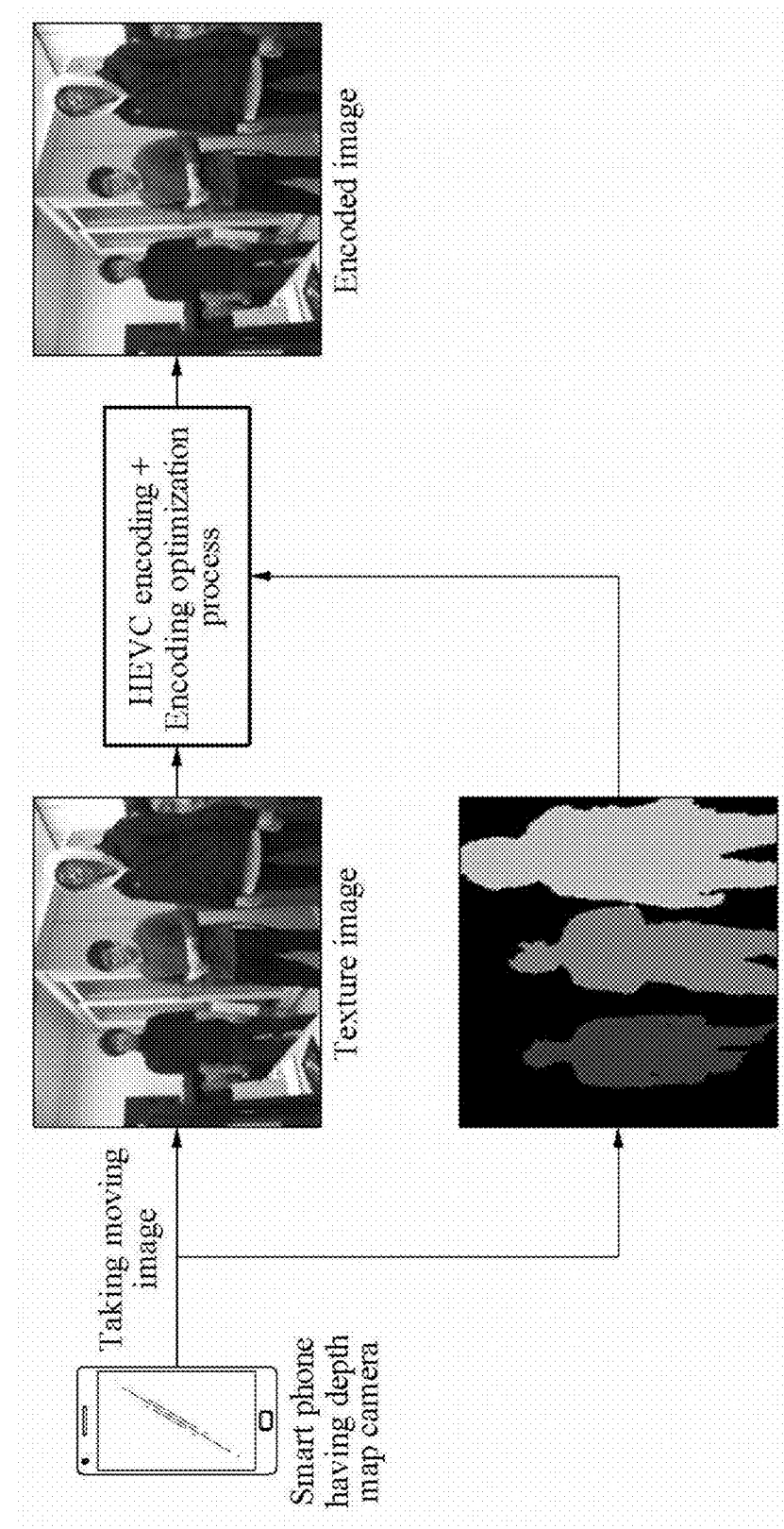
FIG. 8 is a view showing an exemplary encoding of an image by HEVC with a depth image in a smart phone.

FIG. 7 is a view showing an exemplary encoding of an image by HEVC in a smart phone, and FIG. 8 is a view showing an exemplary encoding of an image by HEVC with a depth image in a smart phone.

Referring to FIG. 7, in a smart phone including an HEVC encoder, an image taken by the smart phone is encoded by the HEVC encoder and a service is provided by using the encoded image.

Referring to FIG. 8, in a smart phone including a depth camera, a general image (a texture image) and a depth image are independently generated by the smart phone and an improved encoded image is obtained due to reduction of complexity by the HEVC encoder through optimization using a correlation between the texture image and the depth image.

Although the patent document 1 (US 2014/0085416) discloses a structure of verifying the information regarding the object of the current block from the depth map and merging the blocks, the patent document 1 (US 2014/0085416) does not disclose how the coding unit is divided and encoded using the depth information at all.

In addition, the patent document 2 (KR 10-2012-0137305) and the patent document 3 (KR 10-2014-0048784) does not disclose a content using the depth map at all, or does not clearly suggest a constitution for predicting a division structure of CU.

Figure 9:
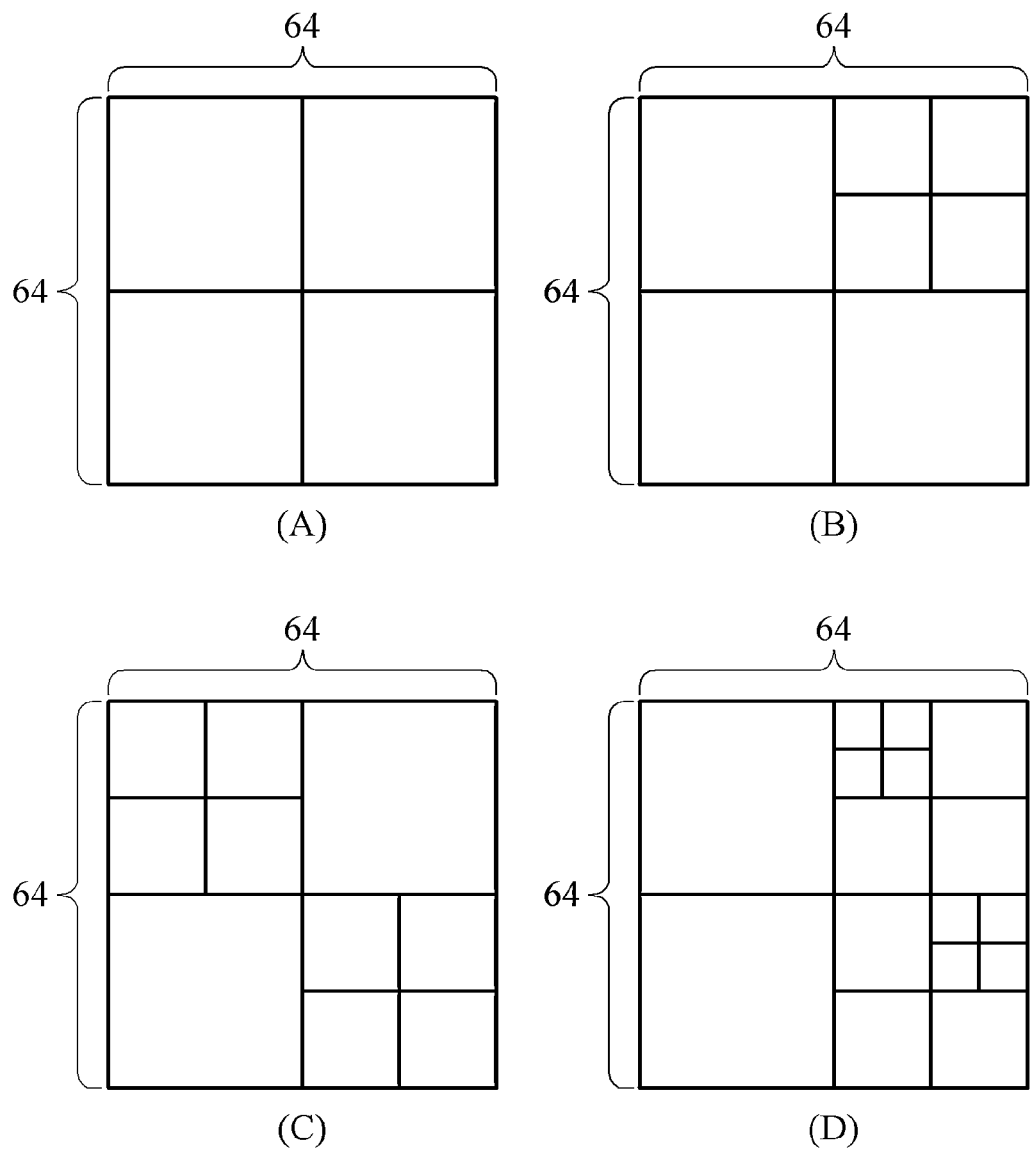
FIG. 9 is examples of dividing an image into a plurality of units.

FIG. 9 is examples of dividing an image into a plurality of units.

In a method of encoding a video with high efficiency, an encoding is performed by dividing an image into a largest coding unit (LCU) which is a fundamental unit of a coding unit (CU). Although the coding unit (CU) performs a role similar to a macro block (MB) which is a fundamental block of H.264/AVC of a typical video codec, the CU may have a variable size differently from the MB having a fixed size of 16×16. In addition, the LCU which is divided for encoding may be divided again into a plurality of CUs each having a size smaller than the LCU for efficient encoding.

Referring to FIG. 9, the LCU having a size of 64×64 may be divided into a plurality of CUs through various ways.

FIG. 9(A) shows an example of dividing an LCU having a size of 64×64 and a division depth of 0 into a plurality of CUs each having a size of 32×32 and a division depth of 1. FIG. 9(B) shows an example of dividing one of a plurality of CUs each having a size of 32×32 into a plurality of CUs each having a division depth of 2, and FIG. 9(C) shows an example of dividing two of a plurality of CUs each having a size of 32×32 into a plurality of CUs each having a division depth of 2. FIG. 9(D) shows an example including a plurality of CUs each having a division depth of 3. Accordingly, a division structure candidate of LCU or CU may exist in various ways.

A division structure of LCU is a division information of a coding unit. After various division structures as mentioned above are generated and stored in a division structure candidate, one division structure of a division structure candidate of LCU is selected by LCU as an optimum LCU division structure at a step of determining an optimum LCU division structure. Since the encoding is performed on the basis of the adaptive LCU division structure in accordance with an image property by LCU, efficient encoding may be performed in coding efficiency and image quality.

Figure 10:
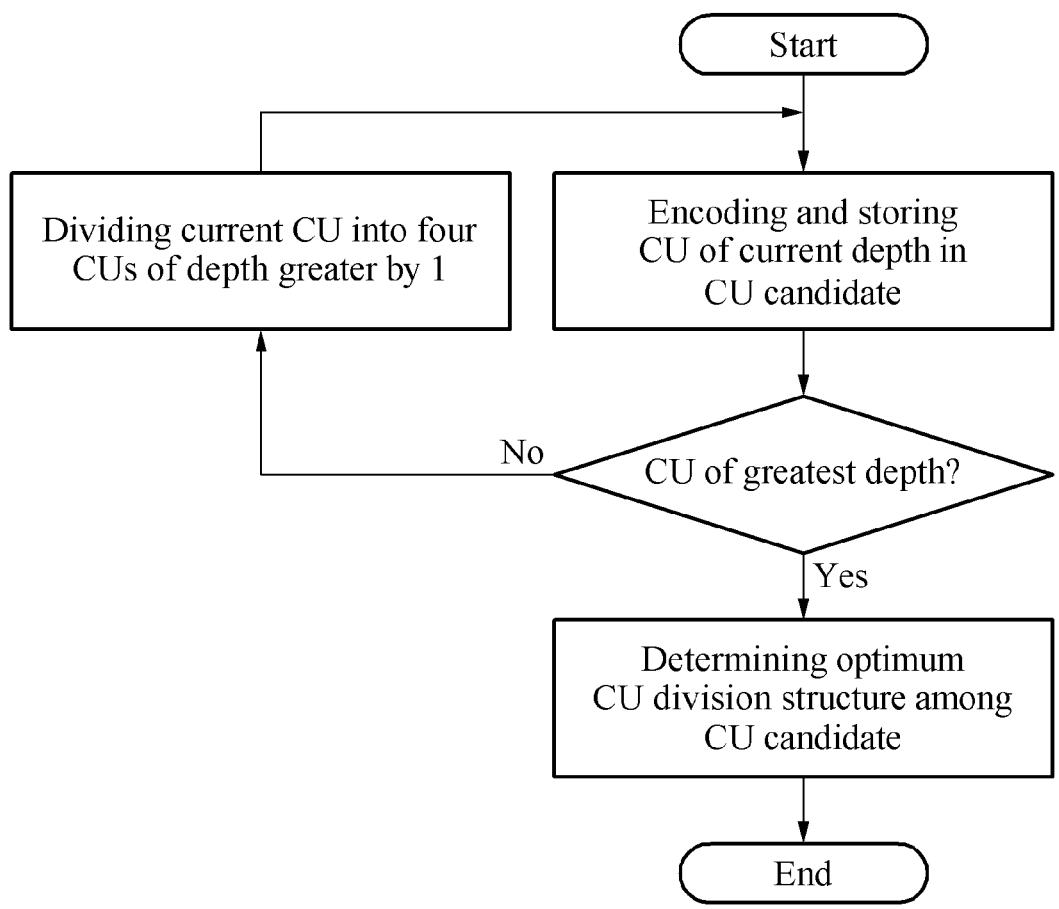
FIG. 10 is an example of determining CU division structure by LCU.

FIG. 10 is an example of determining CU division structure by LCU.

In an encoder of HEVC, a division method of a coding unit in LCU may be differently determined according to the image property. For the purpose of determining an optimum LCU division structure, division structures of various cases may be encoded. A method such that an encoding is performed for each division depth using a prediction mode (Intra mode, Inter mode, etc.) of all coding units and then the prediction mode of the corresponding coding unit is determined according to coding bit amount and image quality may be used as a method of determining an optimum LCU division structure.

For example, as shown in FIG. 9, after each encoding is performed using an Intra mode and an Inter mode, etc. by a coding unit of a size of 64×64 and a depth of 0, an optimum mode is stored. The coding unit of a size of 64×64 is divided into four coding units, and each encoding may be recursively performed using an Intra mode and an Inter mode, etc. by a coding unit of a size of 32×32. Here, a prediction mode may be independently selected for each of the four divided coding units of a size of 32×32. In addition, an encoding is performed by four divided coding units of a size of 16×16 in the coding unit of a size of 32×32. After the encoding is recursively performed by dividing the corresponding coding unit, the division structure of the most efficient coding unit in bit amount and image quality is determined.

For example, when bit amount and image quality of the encoding by the four coding units of a size of 32×32 are more efficient than those of the encoding by the coding unit of a size of 64×64, the corresponding coding unit is determined to be divided into the four coding units of a size of 32×32. When the image is encoded in the encoder (apparatus of encoding video), distribution of optimum coding units is found for all cases and calculation complexity of the encoder increases.

A phenomenon where calculation complexity increases to judge coding efficiency of many cases for efficient compression performance occurs.

Figure 11:
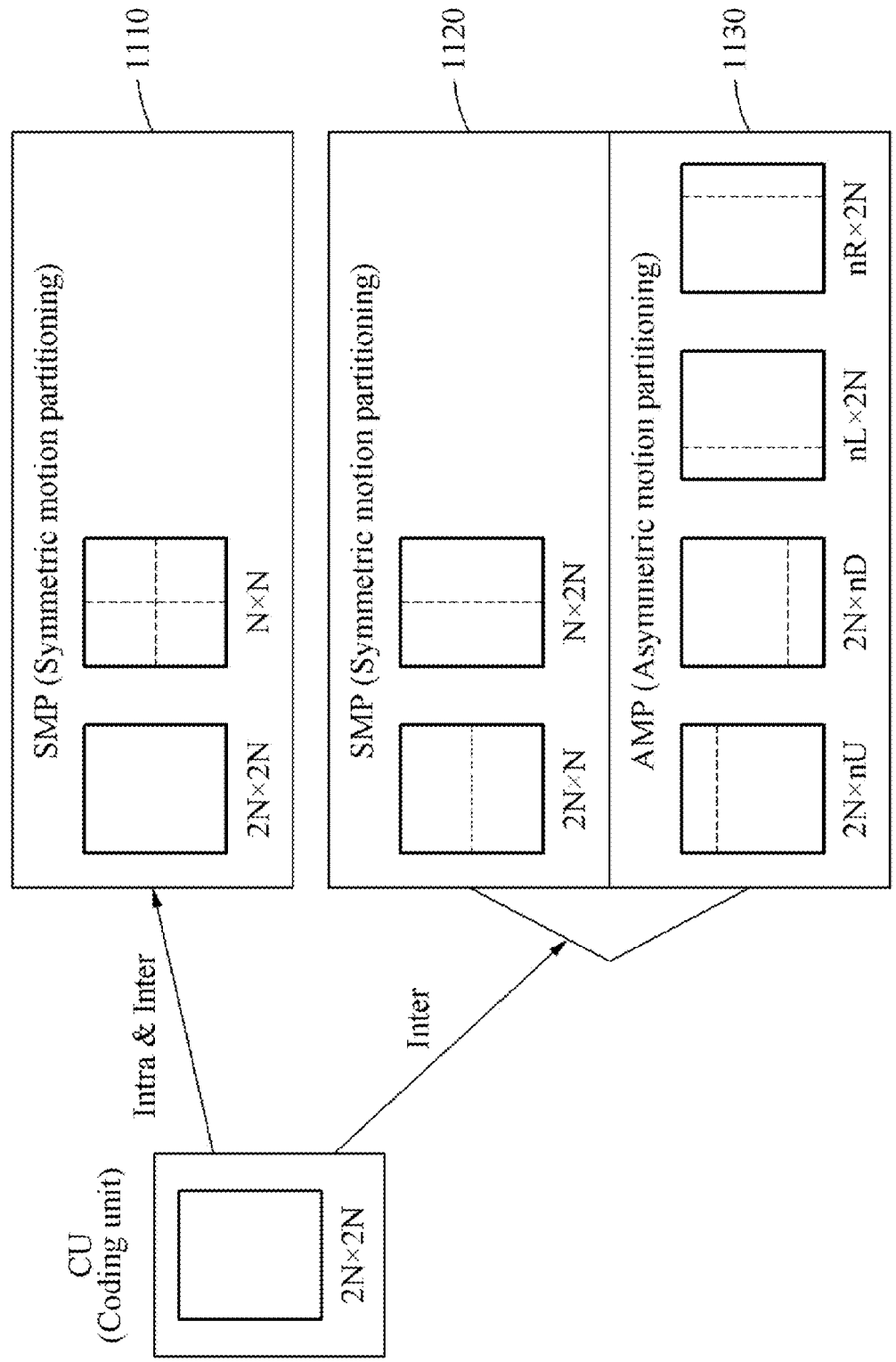
FIG. 11 is a view illustrating an example of dividing an image into a plurality of prediction units.

FIG. 11 is a view illustrating an example of dividing an image into a plurality of prediction units.

Referring to FIG. 11, a basic structure of CU may be represented by a square of a size of 2N×2N, and a prediction structure divided in CU may be represented by the prediction unit (PU).

The reference number 1110 represents examples of a SMP (symmetric motion partitioning) as a symmetric division structure, and the reference number 1120 represents examples of 2N×N and N×2N structures as an up-and-down or right-and-left symmetric division structure. In addition, the reference number 1130 represents examples of AMP (asymmetric motion partitioning), 2N×nU, 2N×nD, nL×2N and nR×2N structures (n is an integer, each of U, D, L and R is an integer or a rational number) as an asymmetric division structure.

The PU is a structure determined for further efficient encoding when the encoding is performed using an Intra mode or an Inter mode by the CU. When an exact prediction is not obtained in the performance of the encoding by the CU, the CU may be divided into the PUs and the encoding may be performed by independently predicting each PU. In the process of determining the PU division structure, the prediction value may be determined as the PU division structure closest to the current block by predicting the current block with all the PU division structures shown in FIG. 11.

The division structure determination and the PU division structure determination of FIGS. 9 to 11 do not consider an object information with respect to adjacent blocks. Since the object information is extracted from the two-dimensional image without a depth camera by the analysis of two-dimensional image, a method of using the object information is never included in the existing method of encoding two-dimensional video.

By the same token, the encoding method using the object information is never included even in the method of determining the division structure of HEVC. However, when the object information can be considered by using the depth camera, the correlation according to the object constitution information of the corresponding CU may be obtained in the method of determining the division structure and the division structure may be determined with the efficient prediction. As a result, complexity of the encoding is efficiently reduced.

Accordingly, when the depth information is used in the method of determining the division structure, complexity of the encoding may be efficiently reduced by judging the object information or the structure of the object region of the corresponding CU and predicting the efficient division structure of the corresponding region.

Figure 12:
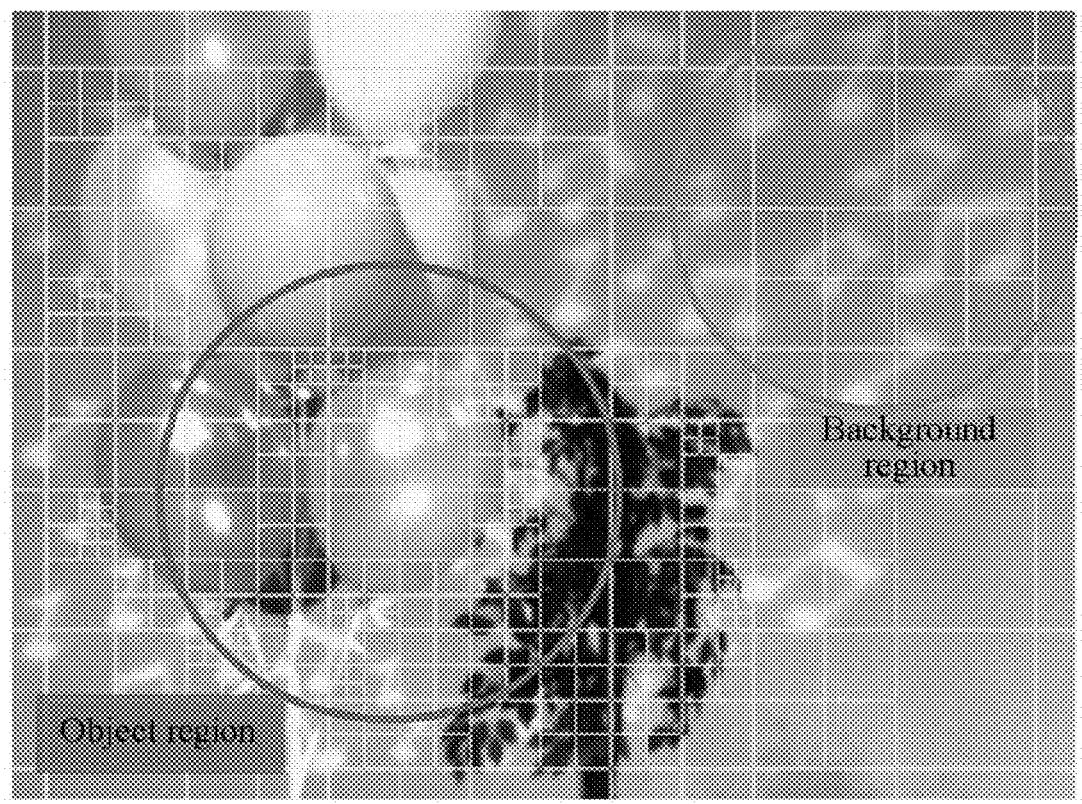
FIG. 12 is a view showing an example of a general image.
Figure 13:
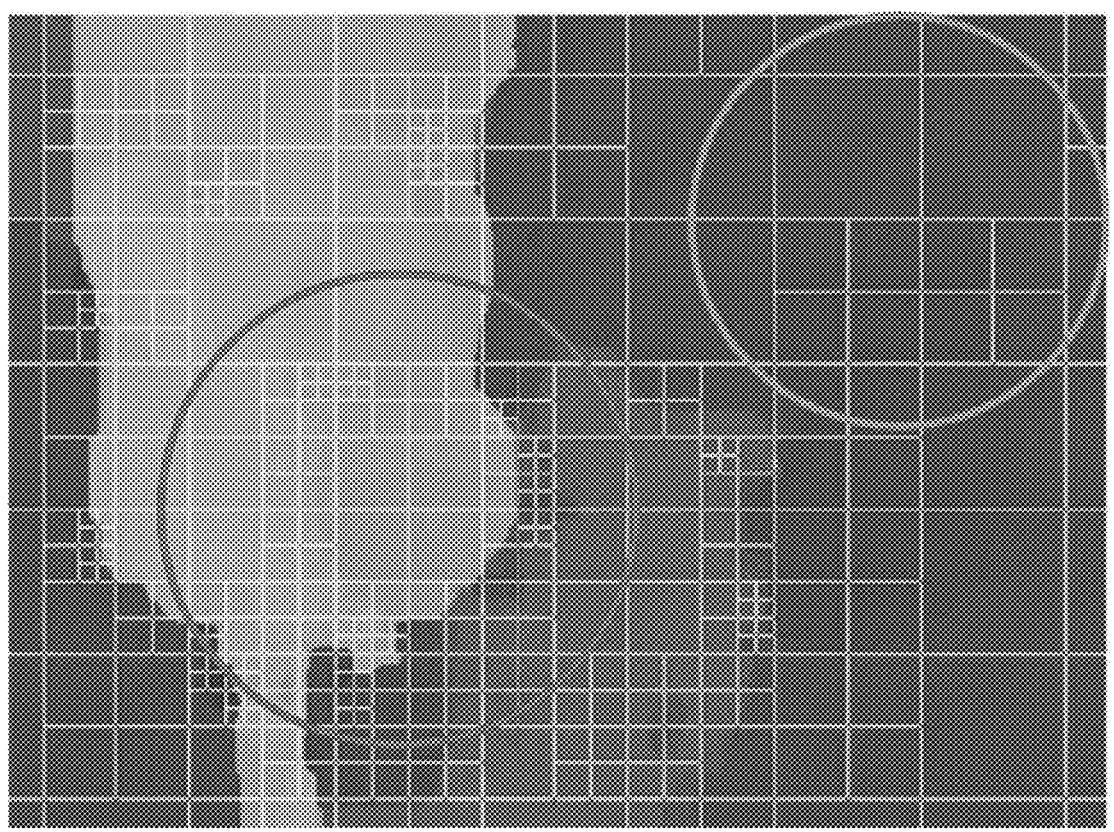
FIG. 13 is view showing an example of a depth information map of a general image of FIG. 12.

FIG. 12 is a view showing an example of a general image, and FIG. 13 is view showing an example of a depth information map of a general image of FIG. 12.

As shown in FIGS. 12 and 13, it is likely that a portion corresponding to an object boundary region has a complex CU division structure and another portion judged as an inner object region or a background region has a relatively simple division structure.

Accordingly, when the object information of the region where the encoding is currently performed is obtained by using the depth information, it may be predicted with high probability that the current encoding region is determined as a complex division structure having a large number of CUs or a simple division structure having a small number of CUs. The amount of calculation may be reduced by restricting division structure determination having low probability. In the method according to the present disclosure, the division structure having high probability may be predicted and encoded by using the depth information in the division structure determination.

In the two-dimensional video codec according to the prior art, algorithms are designed without reflecting use of the depth information. However, since the real image and the depth information image thereof have great correlation, the method of using the depth information in the two-dimensional video encoding may be considered by developing an algorithm reflecting the depth information based on that the depth information can be used for the encoding the two-dimensional image.

The basic principle of the present disclosure for the efficient encoding in the two-dimensional video codec is to use the depth information in a method of predicting a motion so that the depth information obtained by the depth information camera can be utilized for the encoding of the real image.

For example, when the encoding is performed by classifying the objects of the general image using the depth information image, complexity of the encoding of the general image may be greatly reduced.

Here, the objects means a plurality of objects and may include the background image. In the block-based encoding codec, a plurality of objects may be exist in a block and different encoding methods may be applied to the plurality of objects based on the depth information image.

Figure 14:
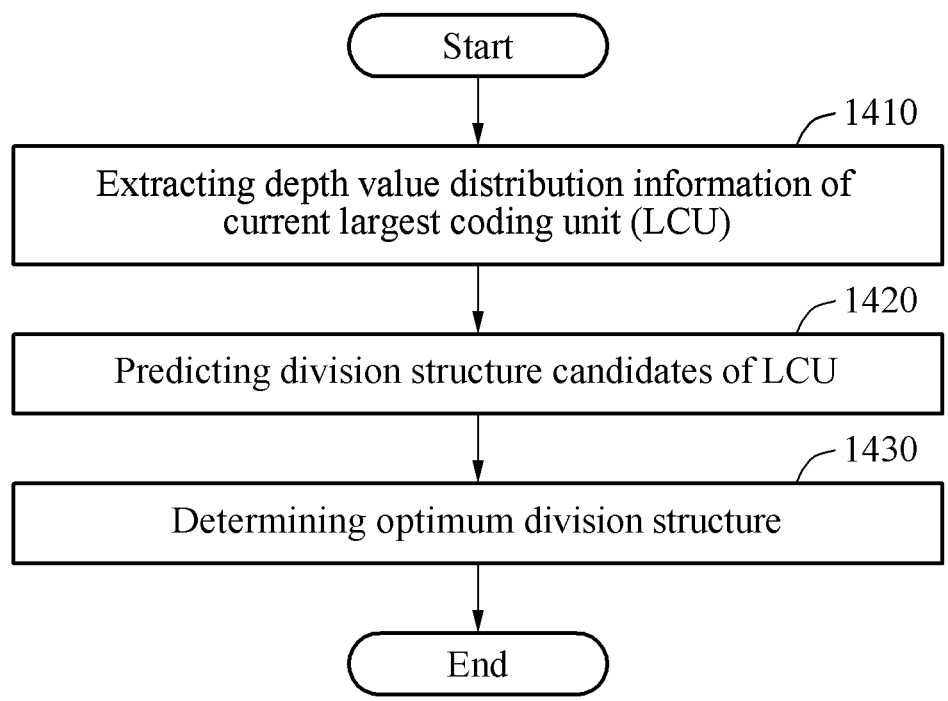
FIG. 14 is a view showing a method of encoding an image according to an embodiment of the present disclosure.

FIG. 14 is a view showing a method of encoding an image according to an embodiment of the present disclosure.

Referring to FIG. 14, at a step of 1410, an apparatus of encoding an image may extract a depth value distribution information of a current largest coding unit (LCU) from a depth image.

Here, the depth value distribution information may be a depth information map of CU as shown in FIGS. 19(A) and 19(B) and may be represented by a normalized value. For example, in FIG. 19(B), the normalized depth value of M1 may be 9, the normalized depth value of M2 may be 7, and the normalized depth value of M3 may be 1.

At a step 1420, the apparatus of encoding an image may predict division structure candidates of the LCU based on the depth value distribution information.

Here, the step 1420 of predicting the division structure candidates of the LCU may include a process of verifying the depth value distribution information of the CU included in the current LCU and a process of verifying whether the CU is formed of a single object or not based on the depth value distribution information of the CU and ending prediction of the division structure candidates of the CU when the CU is formed of the single object.

At a step 1430, an optimum division structure may be determined among the division structure candidates of the LCU based on at least one of coding efficiency and image quality.

Here, at the step 1430 of determining the optimum division structure, the apparatus of encoding an image may predict the object structure of the CU based on the depth value distribution information and may determine the optimum division structure by omitting a part of calculation of rate-distortion cost based on the prediction of the object structure of the CU.

Figure 15:
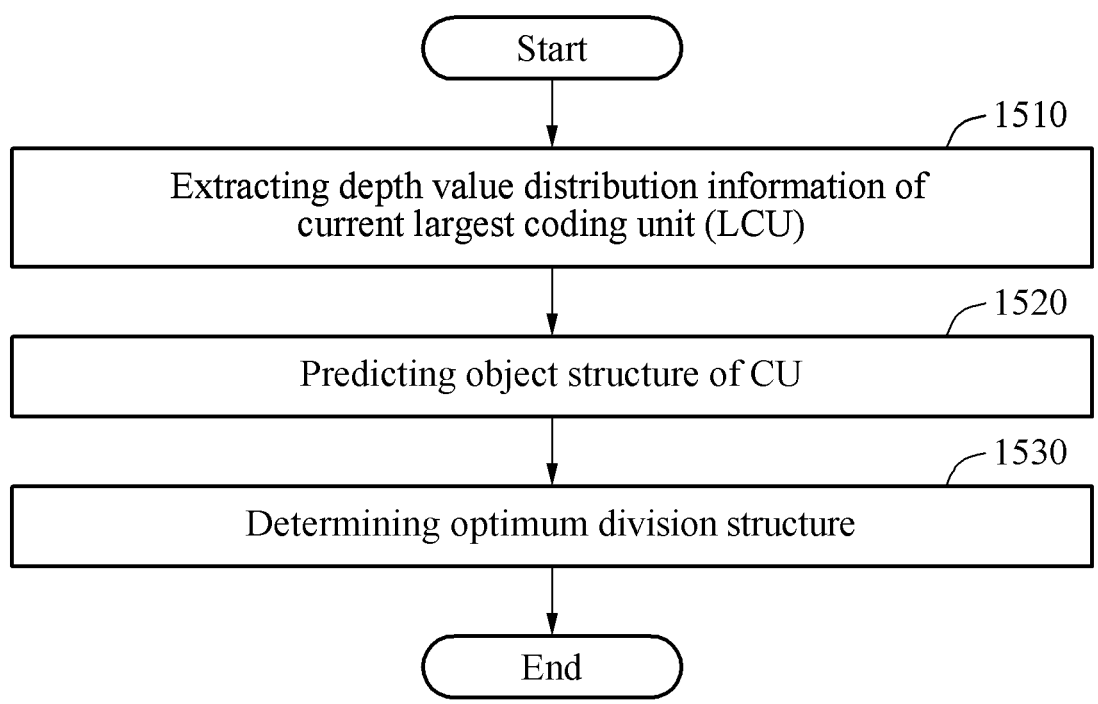
FIG. 15 is a view showing a method of encoding an image according to another embodiment of the present disclosure.

FIG. 15 is a view showing a method of encoding an image according to another embodiment of the present disclosure.

Referring to FIG. 15, at a step 1510, an apparatus of encoding an image may extract a depth value distribution information of a current largest coding unit (LCU).

At a step 1520, the apparatus of encoding an image may predict an object structure of a CU based on the depth value distribution information of the CU included in the LCU.

Here, in the prediction of the object structure, it may be presumed whether the object structure of the CU is a single object, an up-and-down division structure, or a right-and-left division structure from the depth value distribution information of the CU. For the depth value distribution of the CU of FIG. 21(C), when each of right and left portions with respect to a center of the CU has the same depth values equal to or greater than a predetermined number, the object structure may be presumed as a right-and-left division structure. Here, the predetermined number may be set according to an accuracy allowable in the system.

Here, the center of the CU may be a center of a horizontal axis for judging an up-and-down object structure or a center of a vertical axis for judging a right-and-left object structure.

In another example, the object structure may be judged based on whether each of the right and left portions with respect to the horizontal axis has maximum and minimum depth values smaller than a specific value or not.

At a step 1530, the apparatus of encoding an image may determine an optimum division structure among the division structure candidates of the LCU by omitting a part of calculation of rate-distortion cost based on the prediction of the object structure of the CU.

Figure 21:
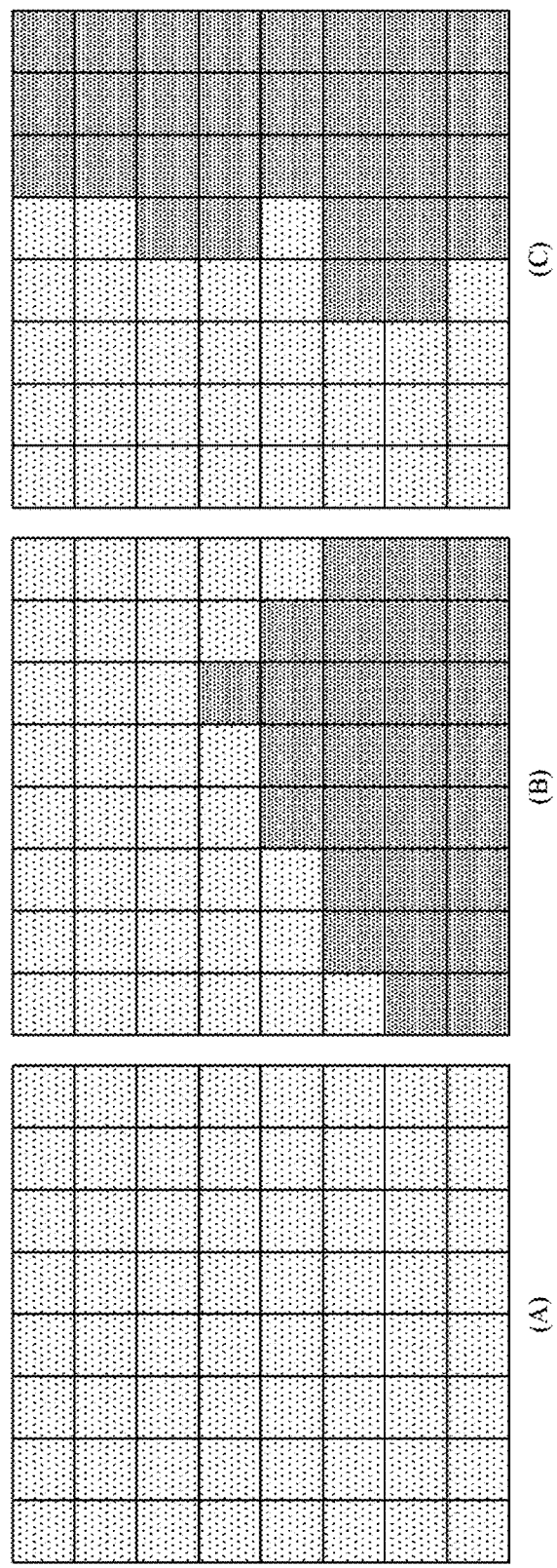
FIG. 21 is a view showing various examples of an object structure of a CU.

The detailed examples of the omitted part in calculation of rate-distortion cost may be illustrated with FIG. 21.

Figure 16:
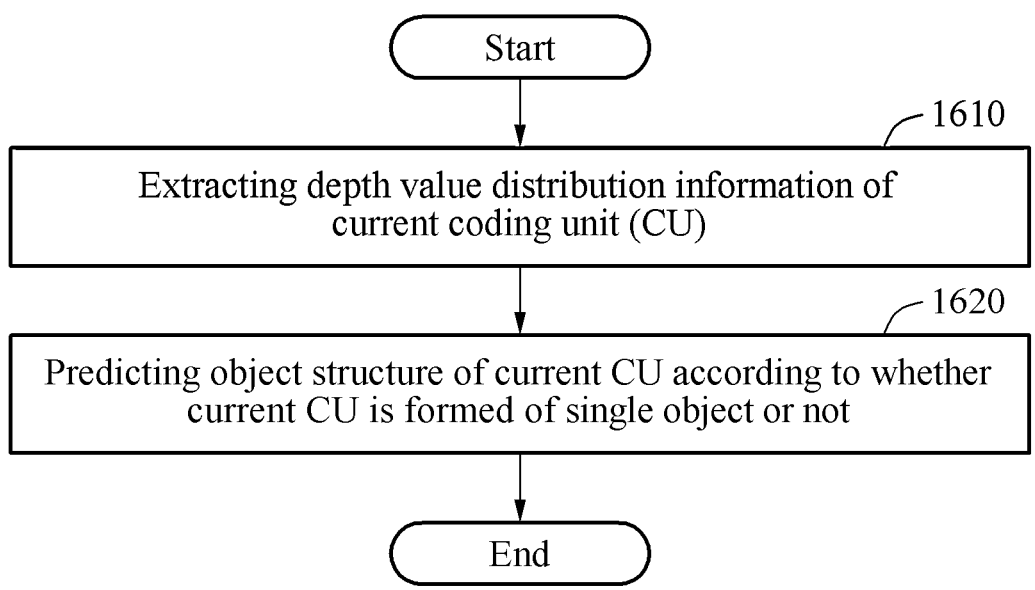
FIG. 16 is a view showing a method of encoding an image according to another embodiment of the present disclosure.

FIG. 16 is a view showing a method of encoding an image according to another embodiment of the present disclosure.

Referring to FIG. 16, at a step 1610, an apparatus of encoding an image may extract a depth value distribution information of a current coding unit (CU) from a depth image.

At a step 1620, the apparatus of encoding an image may verify whether the current CU is formed of a single object or not based on the depth value distribution information and may predict the division structure of the current CU according to whether the current CU is formed of a single object or not.

Here, the step 1620 of predicting a division structure of the current CU may include a process of determining not to divide the current CU when the current CU is formed of a single object.

Accordingly, as shown in FIG. 16, when the CU is judged to have a single object through the depth information, complexity of the encoding may be reduced by determining the division structure candidate such that the CU is not divided any more.

Here, the step 1620 of predicting the division structure of the current CU may include a process of determining not to divide the current CU any more when a size of the current CU is equal to or greater than a predetermined value, the current CU is predicted to have a single object and an encoding mode of the current CU is a skip mode.

Here, the step 1620 of predicting the division structure of the current CU may include a process of determining not to divide the current CU any more when a size of the current CU is smaller than a predetermined value, the current CU is predicted to have a single object, a size of a reference CU of the CU is equal to or greater than the predetermined value and the reference CU is encoded by a skip mode.

Figure 18:
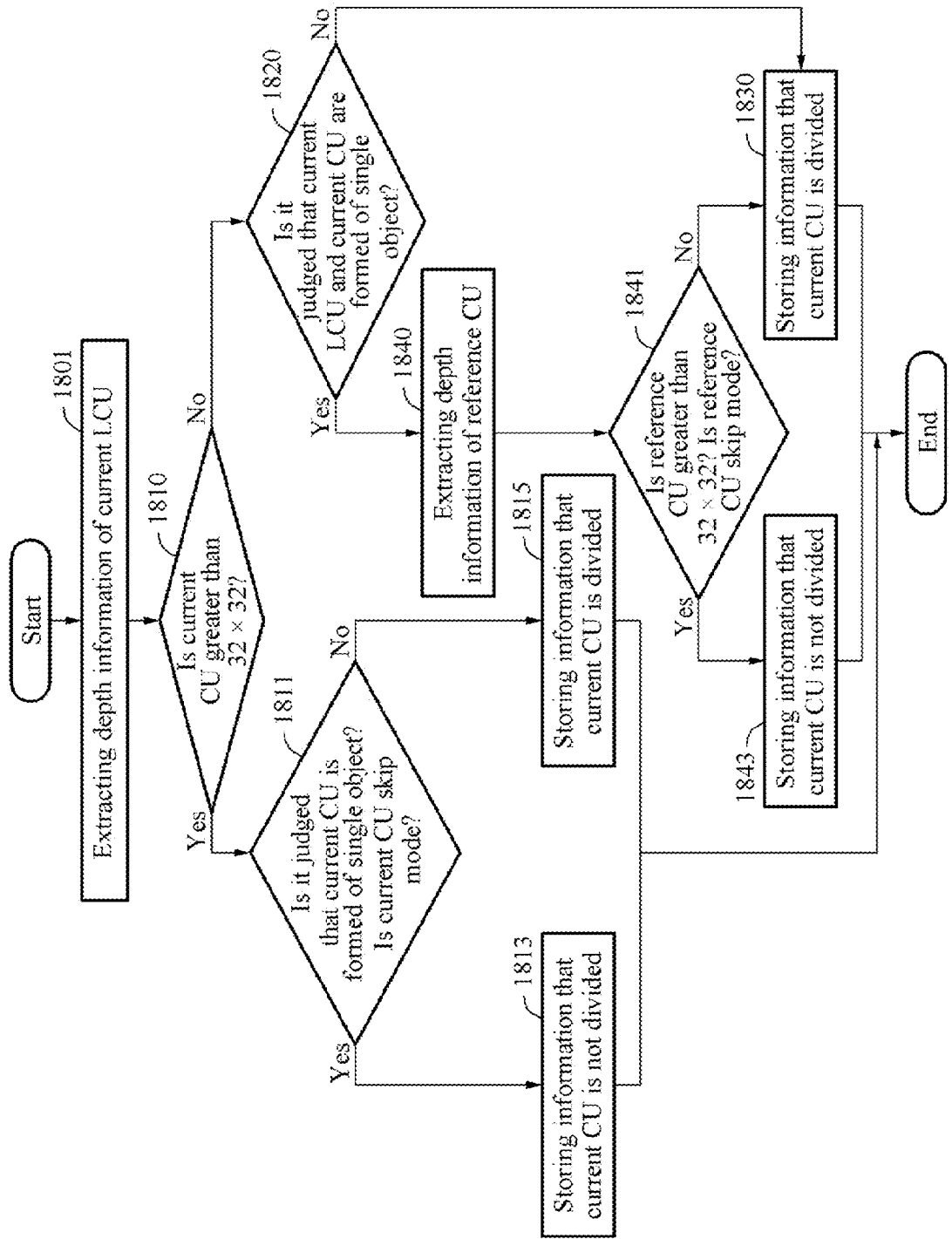
FIG. 18 is a flow chart showing a CU division premature termination process according to an embodiment of the present disclosure.
Figure 19:
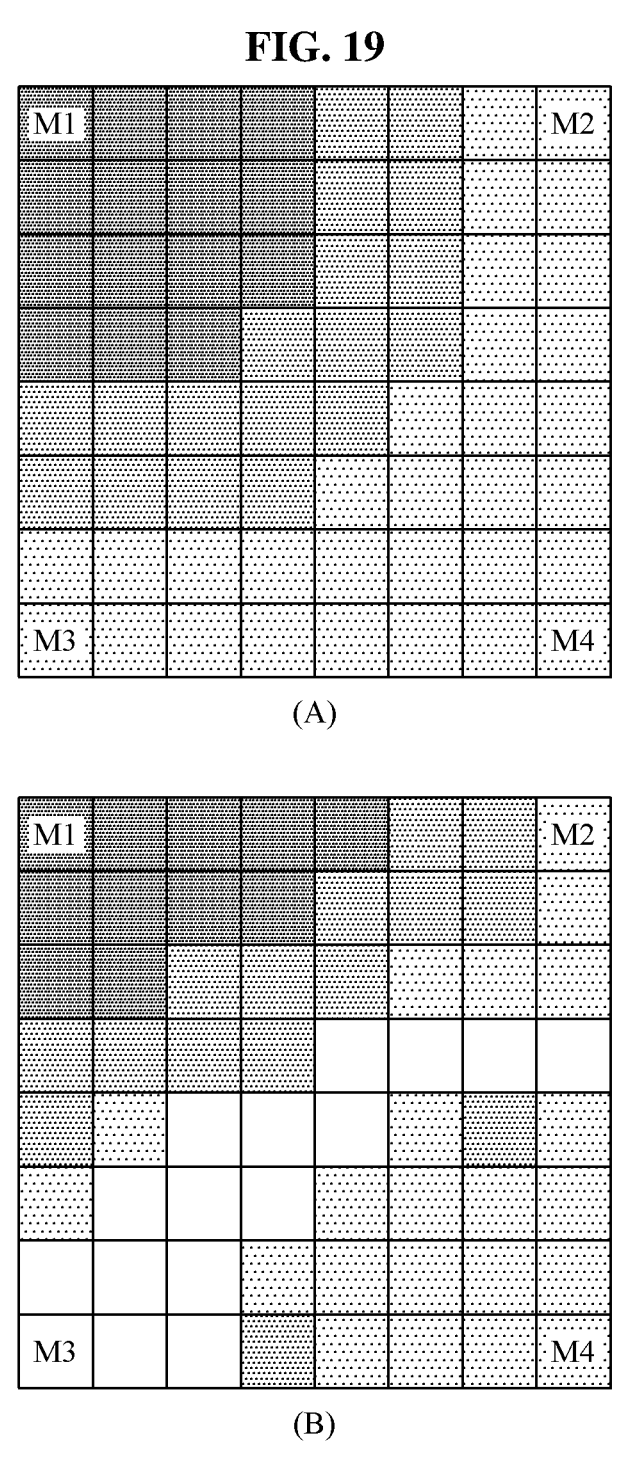
Figure 20:
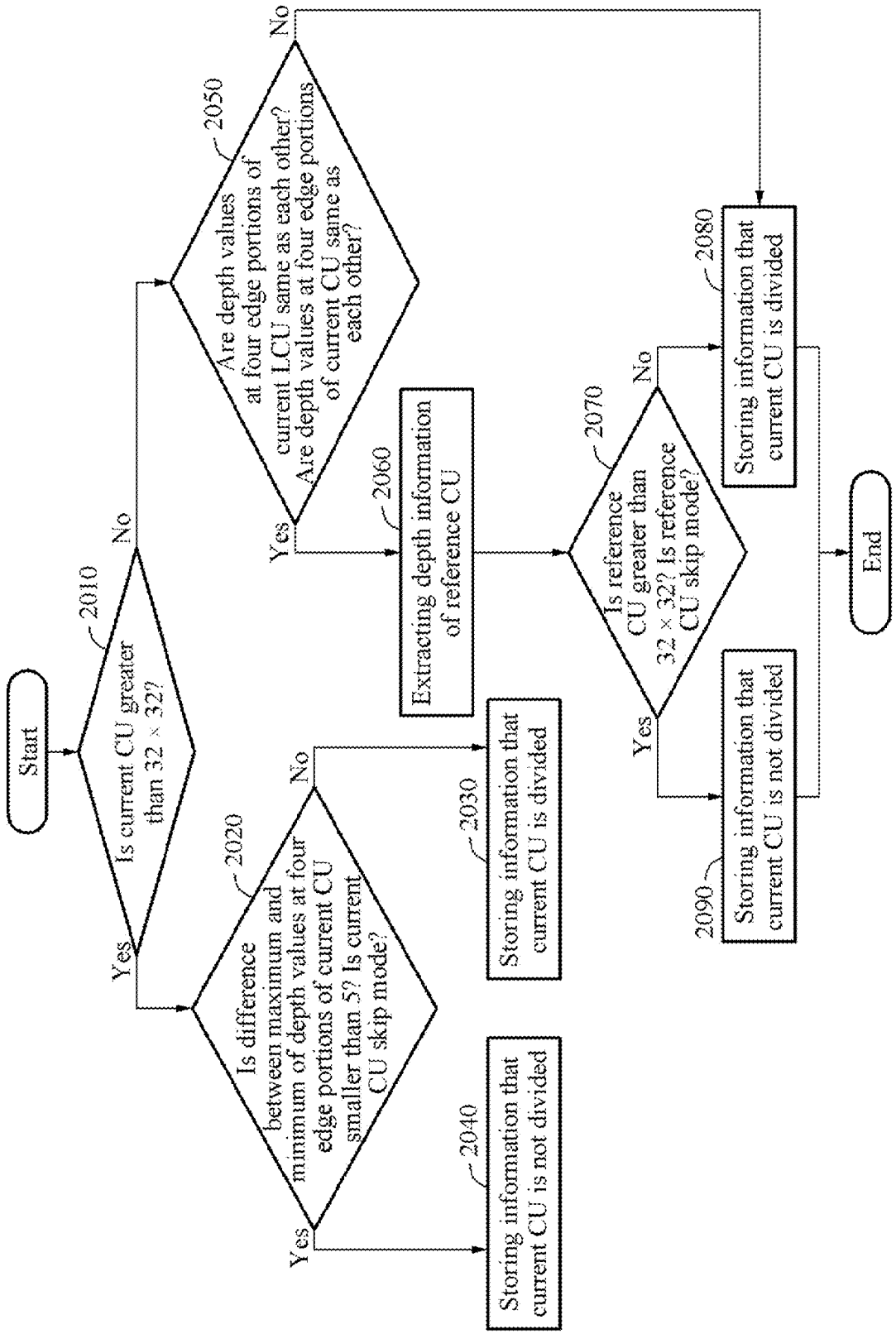
FIG. 20 is a flow chart showing another example of a CU division premature termination process according to an embodiment of the present disclosure.

Here, it may be determined according to depth values at four edges of the CU whether the current CU is formed of a single object, and various examples of determining whether the current CU has a single object or not based on the depth value distribution may be illustrated with FIGS. 18 to 20.

Figure 17:
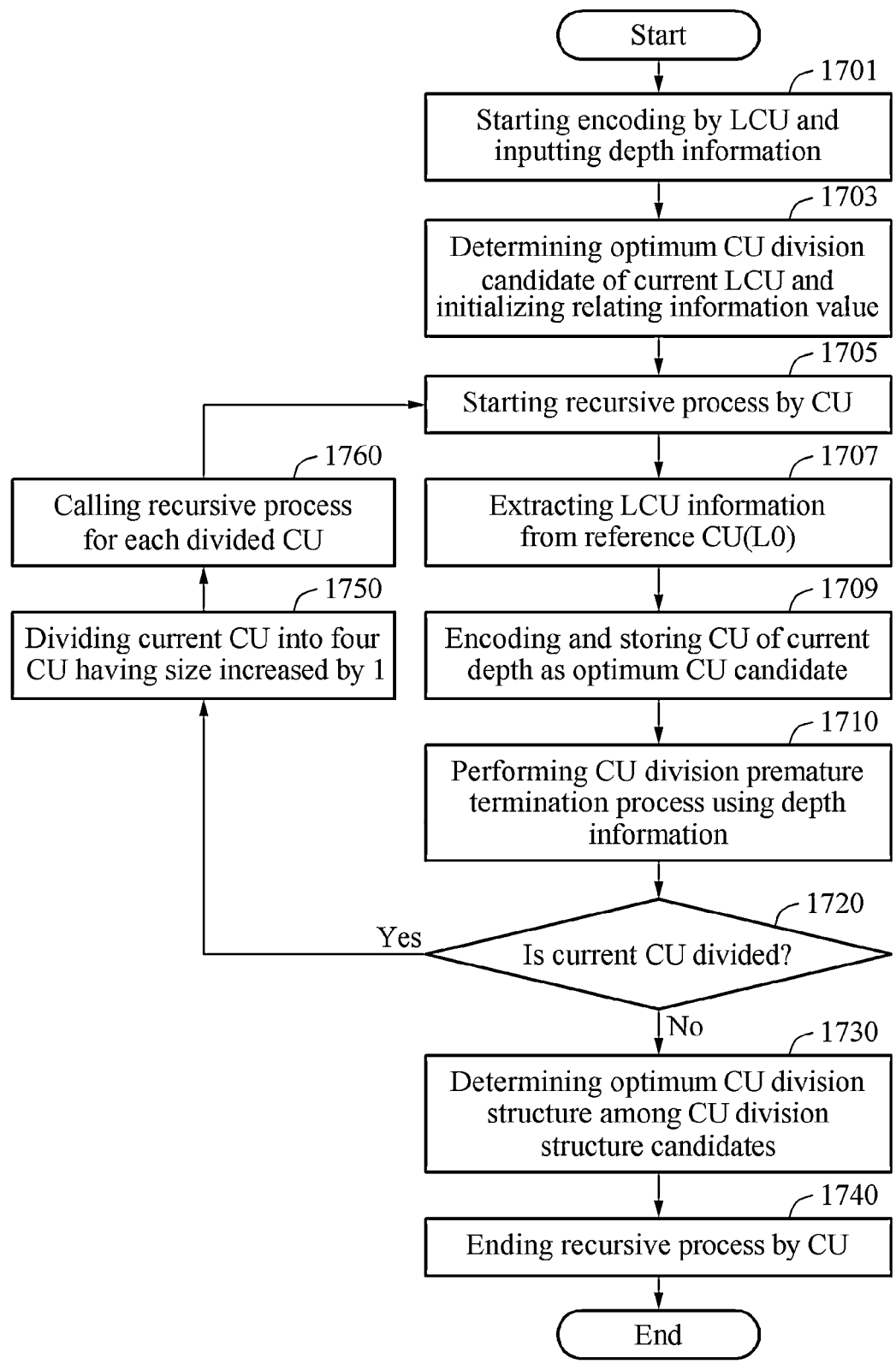
FIG. 17 is a flow chart showing a method of determining an optimum CU division structure by LCU according to an embodiment of the present disclosure.

FIG. 17 is a flow chart showing a method of determining an optimum CU division structure by LCU according to an embodiment of the present disclosure.

FIG. 17 is a flow chart showing a process of determining a division structure by LCU of FIG. 14 in detail.

For example, the step 1410 of FIG. 14 may include steps 1701 and 1703 of FIG. 17. In addition, the step 1420 of FIG. 14 may include steps 1705 to 1710, 1750 and 1760 of FIG. 17.

At a step 1705, the apparatus of encoding an image may start a recursive process by CU at a step 1705. At a step 1707, the apparatus of encoding an image may extract an LCU information such as a depth information or an encoding mode, etc. of a reference CU of the current CU and may encode and store the CU of the current division depth as an optimum CU candidate. For example, the CU of the current division depth may be shown in FIG. 9(A).

At a step 1710, the apparatus of encoding an image may perform a CU division premature termination process using the depth information. Here, the CU division premature termination process may be a prediction process of the division structure candidate shown in FIGS. 14, 18 and 20.

The CU may be determined to be divided through the division premature termination process of the step 1710, and the CU may be divided into four CUs having a division depth increased by 1 at a step 1750.

When the CU division structure candidates are determined as (A), (B) and (C) of FIG. 9 through the recursive process by CU, the apparatus of encoding an image may determine the optimum CU division structure at a step 1730 based on coding efficiency with respect to each division structure candidate.

When the optimum CU division structure is determined, the recursive process by CU may be ended at a step 1740.

FIG. 18 is a flow chart showing a CU division premature termination process according to an embodiment of the present disclosure.

Referring to FIG. 18, a step 1801 of extracting the depth information of the current LCU may be the same as the step 1410 of FIG. 14 or the step 1701 of FIG. 17.

At a step 1810, the current coding unit (CU) may be selected and it may be judged whether a size of the current CU is equal to or greater than 32×32 or not, for example, whether the size of the current CU is 64×64 or 32×32.

When the size of the current CU is equal to or greater than 32×32, a step 1811 may be performed. Otherwise, a step 1820 may be performed.

At the step 1811, it may be judged whether the current CU is formed of a single object or not and whether an encoding mode of the current CU is a skip mode or not. When the current CU is formed of a single object and the encoding mode of the current CU is a skip mode, an information that the current CU is not divided may be stored at a step 1813 and the CU division premature termination process may be ended.

At the step 1811, when the current CU is not formed of a single object or the encoding mode of the current CU is not a skip mode, an information that the current CU is divided may be stored and the CU division premature termination process may be ended.

At a step 1820, the apparatus of encoding an image may judge whether the current LCU and the current CU are formed of a single object or not. When it is judged that the current LCU or the current CU is not formed of a single object, an information that the current CU is divided may be stored at a step 1830 and the CU division premature termination process may be ended.

As a result of judging at the step 1820, when it is judged that the current LCU or the current CU is formed of a single object, a depth information of a reference CU may be extracted at a step 1840 and a step 1841 may be performed.

At the step 1841, the apparatus of encoding an image may judge whether a size of the reference CU is equal to or greater than 32×32 (for example, the size of the reference CU is 64×64 or 32×32) or not and whether an encoding mode of the reference CU is a skip mode or not.

At a step 1841, when the size of the reference CU is equal to or greater than 32×32 and the encoding mode of the reference CU is a skip mode, an information that the current CU is not divided may be stored at a step 1843 and the CU division premature termination process may be ended.

For example, when the size of the current CU is smaller than 32×32, the current CU may be judged to be formed of a single object through the depth information and the reference LCU may be also judged to be formed of a single object through the depth information. When the size of the reference CU is 64×64 or 32×32 and the reference CU is encoded by a skip mode, the current CU may not be divided by predicting the current CU to have a large size, i.e. a simple division structure with high probability.

As a result of judging at the step 1841, when the size of the reference CU is not equal to or greater than 32×32 or the encoding mode of the reference CU is not a skip mode, a step 1830 may be performed.

Here, a skip mode may be an encoding mode where a prediction image for an original image or a differential signal (or a differential image) for a reference image is not encoded or not transmitted to a decoding terminal.

Here, when a difference of the maximum and the minimum in the depth value distribution information of the CU is equal to or smaller than a predetermined value, the CU may be judged to be formed of a single object.

Accordingly, referring to the steps 1810 to 1843 shown in FIG. 18, the step of predicting the division structure candidates of LCU according to an embodiment may include a process of determining whether the CU is divided or not based on at least one of the size of the CU in the current LCU, the difference of the maximum and the minimum in the depth value distribution information of the CU and whether the encoding mode of the CU is a skip mode or not.

FIG. 19 is a view showing examples of a depth value distribution of a CU.

In the method of encoding an image according to an embodiment, as an example of a method of judging whether the CU or the block is formed of the same single object or not, depth values at four edges of the CU or the block may be used.

Referring to FIG. 19, the apparatus of encoding an image may judge that the depth value distribution of the CU such as (A) is uniform with a small change.

On the other hand, the apparatus of encoding an image may judge that the depth value distribution of the CU such as (B) is not formed of a single object because the change is great.

Referring to FIG. 19(B), the change of the depth value at a central portion in the CU and edge portions is very great and the difference between the maximum and the minimum of the depth values at the four edge portions is great. Since the probability that this CU is formed of a single object is low, the division of the CU may be performed.

When the difference between the maximum and the minimum of the depth values at the four edge portions is equal to or smaller than a predetermined reference value, the apparatus of encoding an image may judge that the CU is formed of a single object.

In FIG. 19(A), for example, the normalized depth value at M1 may be 9, the normalized depth value at M2 and M3 may be 7, and the normalized depth value at M4 may be 7.

In FIG. 19(B), the normalized depth value at M1 may be 9, the normalized depth value at M2 and M4 may be 7, and the normalized depth value at M3 may be 1.

Here, the difference between the maximum and the minimum of the depth values at the four edge portions is 2 in FIG. 19(A), and the difference between the maximum and the minimum of the depth values at the four edge portions is 8 in FIG. 19(B).

Accordingly, when the predetermined reference value is 5, it may be judged that FIG. 19(A) is formed of a single object and FIG. 19(B) is not formed of a single object.

FIG. 20 is a flow chart showing another example of a CU division premature termination process according to an embodiment of the present disclosure.

Referring to FIG. 20, at a step 2010, the apparatus of encoding an image may judge whether the current CU is equal to or greater than 32×32 or not. When a condition of the step 2010 is satisfied, a step 2020 may be performed. Otherwise, a step 2050 may be performed.

At a step 2020, the apparatus of encoding an image may judge whether a size of the CU is equal to or greater than a predetermined value or not, whether the difference between the maximum and the minimum of the depth values at the four edge portions of the CU is equal to or smaller than the predetermined reference value or not, and whether the CU is encoded by a skip mode or not.

Here, the predetermined reference value may be 5.

When a condition of the step 2020 is satisfied, an information that the current CU is not divided may be stored and the CU division premature termination process may be ended.

Accordingly, a step of predicting the division structure candidates of the LCU according to an embodiment may include a process of determining that the CU is not divided when the size of the CU is equal to or greater than the predetermined value, the difference between the maximum and the minimum of the depth values at four edge portions of the CU is equal to or smaller than the predetermined reference value, and the CU is encoded by a skip mode.

When the condition of the step 2020 is not satisfied, an information that the CU is divided may be stored and the CU division premature termination process may be ended.

At a step 2050, the apparatus of encoding an image may judge whether the size of the CU is smaller than the predetermined value or not and whether the depth values at four edge portions of each of the LCU and the CU are the same as each other or not.

When a condition of the step 2050, a step 2060 may be performed. Otherwise, a step 2080 may be performed.

At the steps 2060 and 2070, the apparatus of encoding an image may extract a depth information of a reference CU and may judge whether a size of the reference CU is equal to or greater than 32×32 or not and whether an encoding mode of the reference CU is a skip mode or not.

When a condition of the step 2070 is satisfied, a step 2090 may be performed. Otherwise, the step 2080 may be performed.

Accordingly, a step of predicting the division structure candidates of the LCU according to an embodiment may include a process of determining that the CU is not divided when the size of the CU is smaller than the predetermined value, the depth values at four edge portions of each of the LCU and the CU are the same as each other, the size of the reference CU of the CU is equal to or greater than the predetermined value, and the CU is encoded by a skip mode.

FIG. 21 is a view showing various examples of an object structure of a CU.

According to an embodiment of the present disclosure, an object structure of a CU may be judged through a depth information and a rate-distortion cost (RD-Cost) calculation required for prediction of a division structure mode in division structure determination may be simplified.

Since the object structure information is predicted by using the depth value distribution information of the CU, determination of mode prediction may be simplified by not performing an asymmetric motion partitioning (AMP) RD-cost calculation when a condition is satisfied.

For example, in case of the CU formed of a single object structure such as FIG. 21(A), the probability that the division structure mode of the corresponding CU is selected as one of AMP is low. As a result, the RD-cost calculations for 2N×nU, 2N×nD, nL×2N and nR×2N may not be performed.

Accordingly, in the step of predicting the optimum division structure or the process of simplifying the division structure determination, the rate-distortion cost calculations for the asymmetric motion partitioning (AMP) of the CU may be omitted when the object structure of the CU is predicted as a single object.

In addition, in case of the CU formed of an up-and-down division object such as FIG. 21(B), since the probability that upper and lower portions of the CU are formed of different objects is high, the RD-cost calculations for nL×2N and nR×2N may not be performed.

Accordingly, in the step of predicting the optimum division structure or the process of simplifying the division structure determination, the calculation relating to a right-and-left division among the rate-distortion cost calculations for the asymmetric motion partitioning (AMP) of the CU may be omitted when the object structure of the CU is predicted as an up-and-down division structure.

Further, in case of the CU formed of a right-and-left division object such as FIG. 21(C), since the probability that right and left portions of the CU are formed of different objects is high, the RD-cost calculations for 2N×nU and 2N×nD may not be performed.

Accordingly, in the step of predicting the optimum division structure or the process of simplifying the division structure determination, the calculation relating to a up-and-down division among the rate-distortion cost calculations for the asymmetric motion partitioning (AMP) of the CU may be omitted when the object structure of the CU is predicted as a right-and-left division structure.

Figure 22:
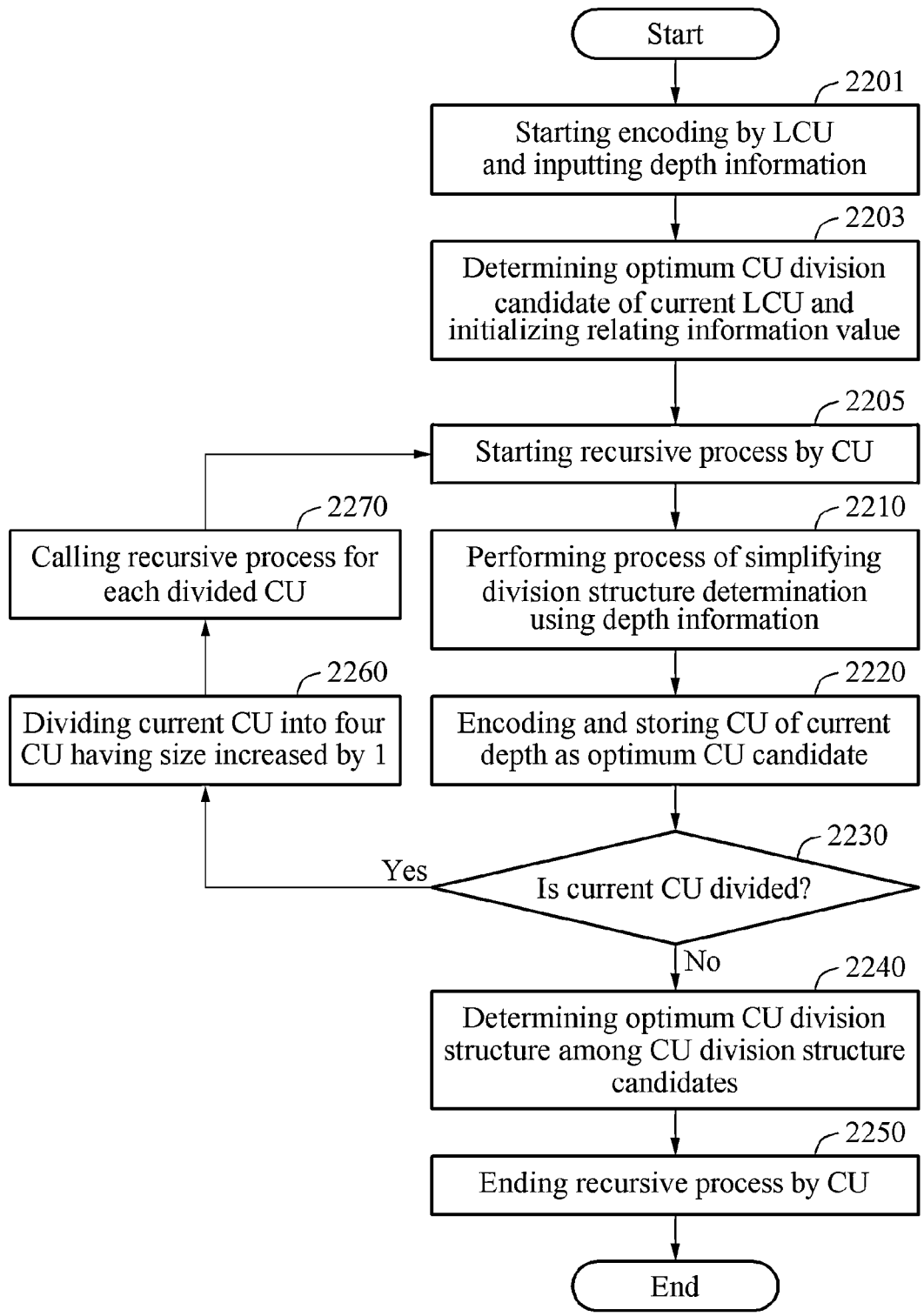
FIGS. 22 and 23 are views showing methods of encoding an image according to an embodiment of the present disclosure.
Figure 23:
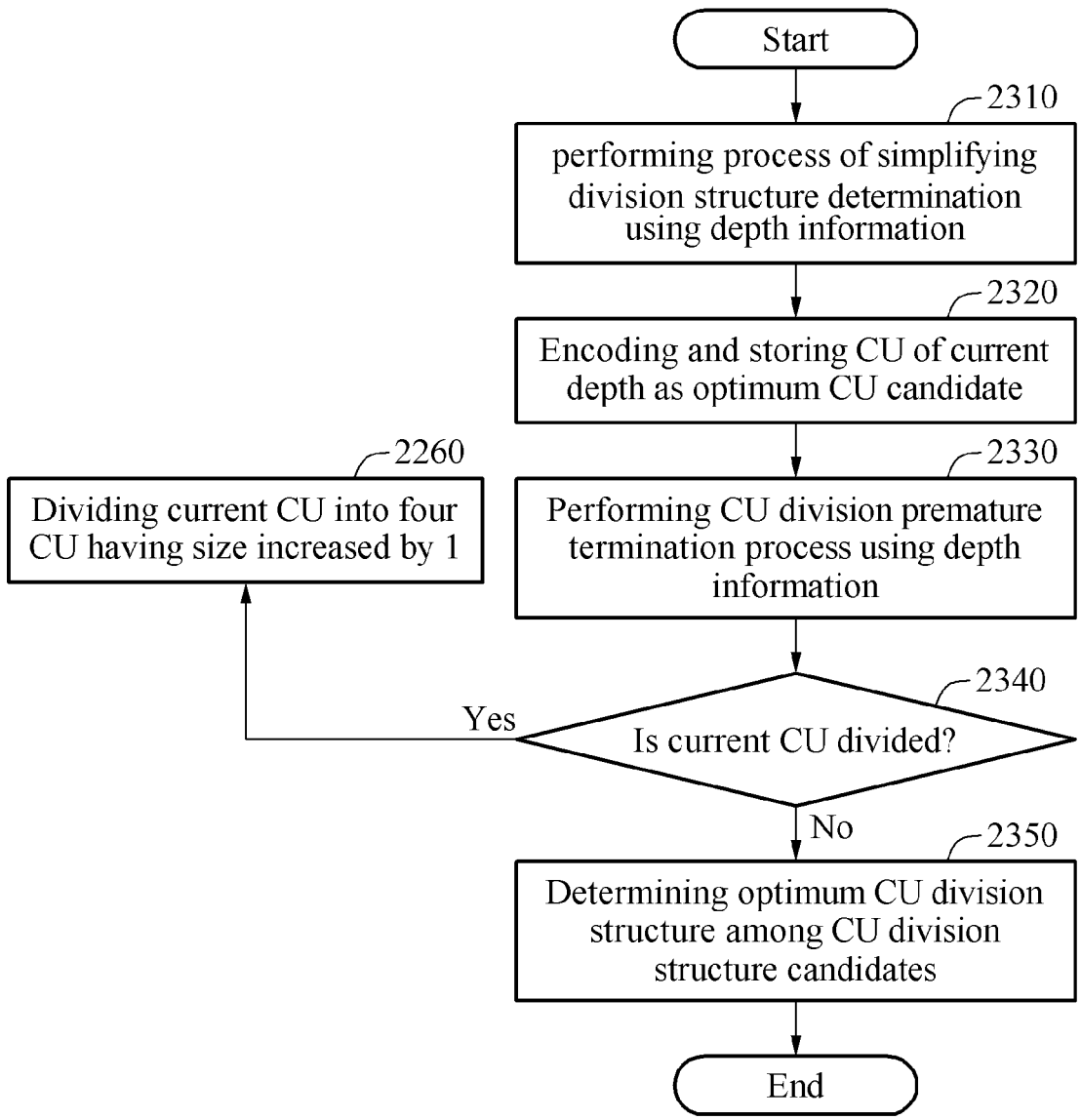

FIGS. 22 and 23 are views showing methods of encoding an image according to an embodiment of the present disclosure.

Referring to FIG. 22, steps 2201, 2203 and 2205 are the same as the steps 1701, 1703 and 1705, respectively, of FIG. 17.

In addition, the other steps 2220 to 2270 except for a step 2210 of performing a process of simplifying a division structure determination using a depth information are the same as the steps 1709 to 1760, respectively, of FIG. 17.

Figure 24:
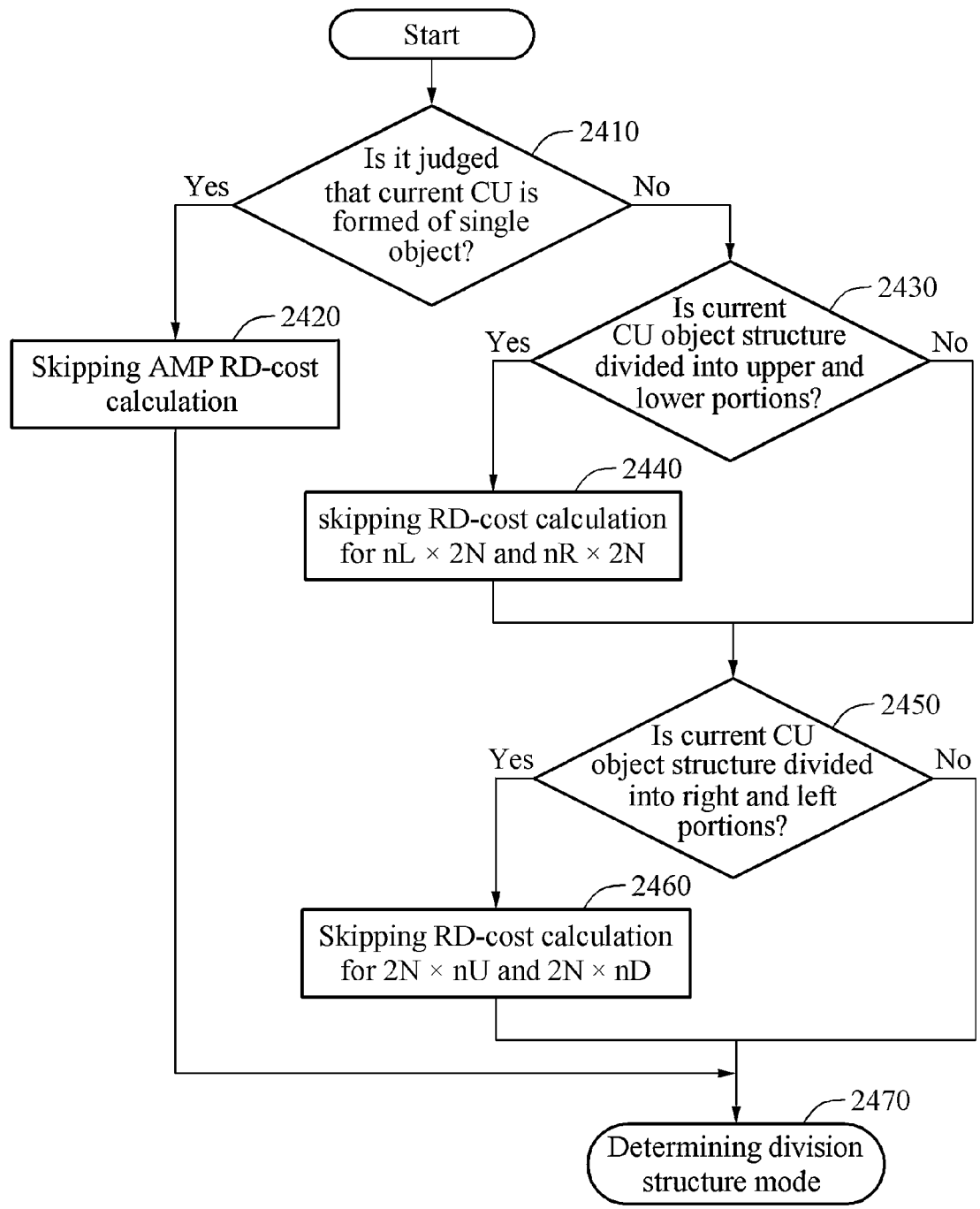
FIG. 24 is a view showing a process of simplifying a division structure determination according to an embodiment of the present disclosure.
Figure 25:
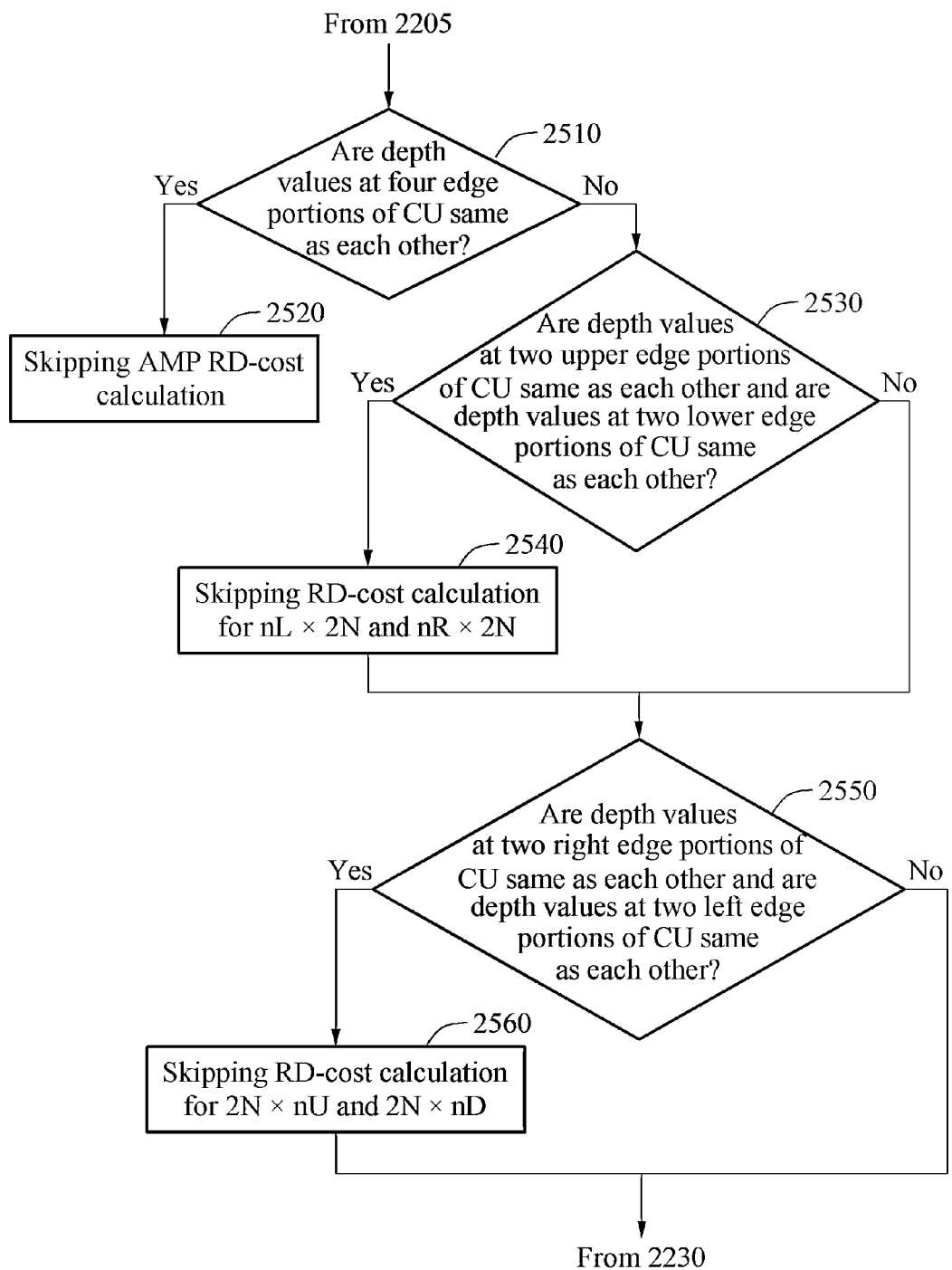
FIG. 25 is a view showing another example of a process of simplifying a division structure determination according to an embodiment of the present disclosure.

Here, the step 2210 of performing a process of simplifying a division structure determination using a depth information may include processes shown in FIG. 24 or processes shown in FIG. 25.

Referring to FIG. 23, after a process of simplifying a division structure determination using a depth information in a process of determining a whole division structure by an LCU is performed, a CU division premature termination process using the depth information may be performed at a step 2330 through a step 2320.

Here, at a step 2310, after an apparatus of encoding an image may store only calculations omitted according to an object structure of a CU, the apparatus of encoding an image may perform the steps 2320 to 2360.

For example, when the rate-distortion cost calculation omitted according to the object structure of the CU is a calculation relating to a right-and-left division among the rate-distortion cost calculations for an asymmetric motion partitioning (AMP), the apparatus of encoding an image may determine an optimum CU division structure among CU division structure candidates based on the calculations omitted at the step 2350.

FIG. 24 is a view showing a process of simplifying a division structure determination according to an embodiment of the present disclosure.

Referring to FIG. 24, at a step 2410, an apparatus of encoding an image may judge that a current CU is formed of a single object. When a condition of the step 2410 is satisfied, a step 2420 may be performed. Otherwise, a step 2430 may be performed.

When the condition of the step 2410 is satisfied, it may be determined that the AMP RD-cost calculation is skipped at the step 2420 and determination of the whole division structure may be completed.

At the step 2430, the apparatus of encoding an image may judge whether the current CU object structure is divided into upper and lower portions or not. When a condition of the step 2430 is satisfied, it may be determined that the rate-distortion cost calculations for nL×2N and nR×2N may be skipped at a step 2440.

At a step 2450, the apparatus of encoding an image may judge whether the CU object structure is divided into right and left portions or not. When a condition of the step 2450 is satisfied, it may be determined that the rate-distortion cost calculation for 2N×nU and 2N×nD may be skipped at a step 2460.

FIG. 25 is a view showing another example of a process of simplifying a division structure determination according to an embodiment of the present disclosure.

FIG. 25 shows an example where an object structure of a CU is predicted through a depth value distribution of a CU.

For example, when depth values at four edge portions of a CU are the same as each other, an apparatus of encoding an image may judge that the CU is formed of a single object at a step 2510 and may perform a step 2520 the same as the step 2420.

In addition, when the depth values at two upper edge portions of the CU are the same as each other and the depth values at two lower edge portions of the CU are the same as each other although the depth values at four edge portions are not the same as each other, the apparatus of encoding an image may judge that the object structure of the CU is divided into upper and lower portions at a step 2530 and may perform a step 2540 the same as the step 2440.

Further, when the depth values at two right edge portions of the CU are the same as each other and the depth values at two left edge portions of the CU are the same as each other although conditions of the steps 2510 and 2530, the apparatus of encoding an image may judge that the object structure is divided into right and left portions at a step 2550 and may perform a step 2560.

Figure 26:
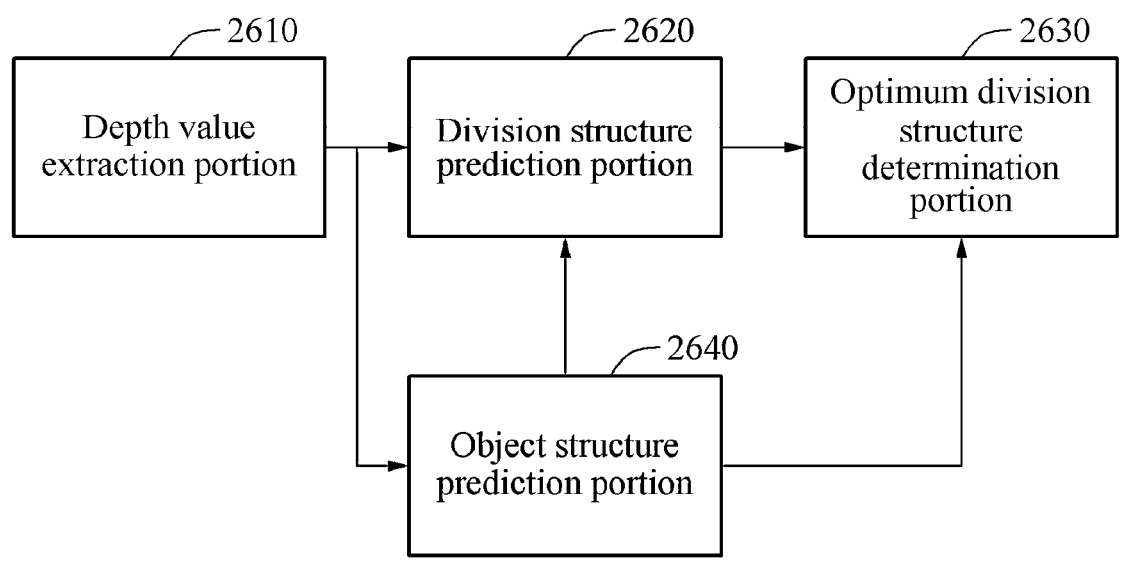
FIG. 26 is a view showing a structure of an apparatus of encoding an image according to an embodiment of the present disclosure.

FIG. 26 is a view showing a structure of an apparatus of encoding an image according to an embodiment of the present disclosure.

An apparatus of encoding an image shown in FIG. 26 may perform a method of encoding an image according to an embodiment of the present disclosure.

Referring to FIG. 26, an apparatus 2600 of encoding an image may include a depth value extraction portion 2610, division structure prediction portion 2620 and an optimum division structure determination portion 2630. The apparatus 2600 of encoding an image may further include an object structure prediction portion 2640.

The depth value extraction portion 2610 may extract a depth value distribution information of a current largest coding unit (LCU) from a depth image.

The division structure prediction portion 2620 may predict division structure candidates of the LCU based on the depth value distribution information. Here, the prediction of the division structure candidates of the LCU may be the step 1710 of performing a CU division premature termination process using a depth information of FIG. 17.

In addition, the division structure prediction portion 2620 may verify whether the current CU is formed of a single object or not based on the depth value distribution information and may predict the division structure of the current CU according to whether the current CU is formed of a single object or not.

The optimum division structure determination portion 2630 may determine an optimum division structure among the division structure candidates of the LCU based on at least one of coding efficiency and image quality.

The object structure prediction portion 2640 may predict the object structure of the CU based on the depth value distribution information of the CU included in the LCU. Here, the optimum division structure determination portion 2630 may determine the optimum division structure among the division structure candidates of the LCU by omitting a part of rate-distortion cost calculations based on prediction of the object structure of the CU.

Table 1 illustrates an experimental result where the embodiment shown in FIG. 25 is applied to HEVC.

It is verified through the experimental result that complexity of the encoding is reduced without great deterioration in image quality

TABLE 1

| | | Low-delay Main | | | | Random-access Main | | | |
|---|---|---|---|---|---|---|---|---|---|
| | | Y BD-rate | U BD-rate | V BD-rate | Encoding Time | Y BD-rate | U BD-rate | V BD-rate | Encoding Time |
| 3DV Test Sequence | Balloons | 0.4% | 0.4% | 0.7% | 70.9% | 0.3% | 0.4% | 0.2% | 69.6% |
| | Kendo | 0.3% | −0.6% | 0.8% | 64.1% | 0.4% | 0.6% | 0.5% | 66.0% |
| | Newspaper_CC | 0.0% | 0.0% | 0.4% | 83.6% | 0.1% | 0.0% | −0.1% | 83.3% |
| | Poznan_Hall2 | 0.7% | 0.5% | 1.5% | 52.0% | 0.6% | 0.0% | 0.0% | 50.3% |
| | Poznan_Street | 0.2% | −0.3% | 0.4% | 74.2% | 0.3% | 0.2% | 0.3% | 73.9% |
| | GT_Fly | 0.8% | 1.2% | 1.3% | 80.6% | 1.6% | 2.1% | 2.2% | 82.4% |
| | Undo_Dancer | 0.3% | 0.5% | 1.5% | 65.2% | 0.2% | 0.4% | 0.7% | 62.5% |
| | Shark | 0.2% | 0.4% | 0.2% | 64.3% | 0.8% | 0.8% | 0.9% | 62.9% |
| 1024X768 Average | | 0.3% | −0.1% | 0.6% | 72.9% | 0.2% | 0.3% | 0.2% | 73.0% |
| 1920X1088 Average | | 0.5% | 0.4% | 1.0% | 67.2% | 0.7% | 0.7% | 0.8% | 66.4% |
| Average | | 0.4% | 0.2% | 0.8% | 69.4% | 0.5% | 0.6% | 0.6% | 68.9% |

In embodiments of the present disclosure, an object scope or an application scope may vary according to a block size or a division depth of a CU, etc.

Here, a variable determining an application scope (i.e. a size or a depth information) may be set such that an apparatus of encoding and an apparatus of decoding use a predetermined value or a value determined according to a profile or a level. Alternatively, a variable determining an application scope (i.e. a size or a depth information) may be set such that an apparatus of encoding writes a variable value on a bitstream and an apparatus of decoding reads the value from the bitstream. Table 2 illustrates a case where an application scope varies according to a CU division depth. A method A may be a method applied to only a depth equal to or greater than a predetermined depth value, a method B may be a method applied to only a depth equal to or smaller than a predetermined depth value, and a method C may be method applied to only a predetermined depth value.

TABLE 2

| CU depth representing application scope | method A | method B | method C |
|---|---|---|---|
| 0 | X | O | X |
| 1 | X | O | X |
| 2 | O | O | O |
| 3 | O | X | X |
| 4 | O | X | X |

Table 2 illustrates an example of methods of determining an application scope for a method of the present disclosure when a CU division depth is 2. (O: applied to the corresponding depth, X: not applied to the corresponding depth)

When the methods of the present disclosure are not applied to all depths, a flag may be written on the bitstream. Alternatively, when the methods of the present disclosure are not applied to all depths, the variable may be expressed by signaling a value greater than the maximum of the CU depths by one with a CU depth value representing the application scope.

In addition, the above methods may be differently applied to a chrominance block according to a size of a brightness block and may be differently applied to a brightness signal image and a chrominance image.

Table 3 illustrates an examples where methods are differently applied according a size of a brightness block and a chrominance block when the methods are combined.

TABLE 3

| size of brightness block | size of chrominance block | application of brightness | application of chrominance | methods |
|---|---|---|---|---|
| 4 (4 × 4, 4 × 2, 2 × 4) | 2 (2 × 2) | ○ or X | ○ or X | a 1, 2, ... |
|  | 4 (4 × 4, 4 × 2, 2 × 4) | ○ or X | ○ or X | b 1, 2, ... |
|  | 8 (8 × 8, 8 × 4, 4 × 8, 2 × 8, etc.) | ○ or X | ○ or X | c 1, 2, ... |
|  | 16 (16 × 16, 16 × 8, 4 × 16, 2 × 16, etc.) | ○ or X | ○ or X | d 1, 2, ... |
|  | 32 (32 × 32) | ○ or X | ○ or X | e 1, 2, ... |
| 8 (8 × 8, 8 × 4, 2 × 8, etc.) | 2 (2 × 2) | ○ or X | ○ or X | f 1, 2, ... |
|  | 4 (4 × 4, 4 × 2, 2 × 4) | ○ or X | ○ or X | g 1, 2, ... |
|  | 8 (8 × 8, 8 × 4, 4 × 8, 2 × 8, etc.) | ○ or X | ○ or X | h 1, 2, ... |
|  | 16 (16 × 16, 16 × 8, 4 × 16, 2 × 16, etc.) | ○ or X | ○ or X | i 1, 2, ... |
|  | 32 (32 × 32) | ○ or X | ○ or X | j 1, 2, ... |
| 16 (16 × 16, 8 × 16, 4 × 16, etc.) | 2 (2 × 2) | ○ or X | ○ or X | k 1, 2, ... |
|  | 4 (4 × 4, 4 × 2, 2 × 4) | ○ or X | ○ or X | l 1, 2, ... |
|  | 8 (8 × 8, 8 × 4, 4 × 8, 2 × 8, etc.) | ○ or X | ○ or X | m 1, 2, ... |
|  | 16 (16 × 16, 16 × 8, 4 × 16, 2 × 16, etc.) | ○ or X | ○ or X | n 1, 2, ... |
|  | 32 (32 × 32) | ○ or X | ○ or X | o 1, 2, ... |

Referring to a method g1 among modified methods of Table 3, when a size of a brightness block is 8 (8×8, 8×4, 2×8, etc.) and a size of a chrominance block is 4 (4×4, 4×2, 2×4, etc.), a method of constituting a merge list according to an embodiment of the present disclosure may be applied to a brightness signal and a chrominance signal.

Referring to a method l2 among the above modified methods, when a size of a brightness block is 16 (16×16, 8×16, 4×16, etc.) and a size of a chrominance block is 4 (4×4, 4×2, 2×4, etc.), a method of constituting a merge list according to an embodiment of the present disclosure may be applied to a brightness signal and may not be applied to a chrominance signal.

In addition, a method of constituting a merge list according to an embodiment of the present disclosure may be applied to a brightness signal and may not be applied to a chrominance signal by the other modified methods. On the contrary, a method of constituting a merge list according to an embodiment of the present disclosure may be applied to a chrominance signal and may not be applied to a brightness signal.

According to an embodiment of the present disclosure, efficient encoding of a two-dimensional image may be performed by encoding a two-dimensional general image using a depth information image obtained from a depth information camera.

An apparatus illustrated above may include a hardware element, a software element and/or a combination of a hardware element and a software element. For example, an apparatus and an element illustrated in an embodiment may include at least one general-purpose computer or at least one special-purpose computer such as a processor, a controller, an arithmetic logic unit (ALU), a digital signal processor, a microcomputer, a field programmable array (FPA), a programmable logic unit (PLU), a microprocessor or another apparatus which can perform an instruction and response. A processing unit may perform an operation system (OS) and at least one software application performed in the operating system. In addition, a processing unit may access, store, operate, process and generate a data in response to performance of a software. For convenience of understanding, although it is illustrated that a single processing unit is used, it is well known to those skilled in the corresponding technical field that a processing unit may include a plurality of processing elements and/or a plural kind of processing element. For example, a processing unit may include a plurality of processors or a processor and a controller. In addition, a processing unit may include another processing configuration such as a parallel processor.

A software may include a computer program, a code, an instruction or a combination of at least one thereof and may constitute a processing unit to operate as required or may order a processing unit independently or collectively. A software and/or a data may be permanently or temporarily embodied in a kind of machine, a component, a physical equipment, a virtual equipment, computer storage media, a computer storage equipment or a transmitted signal wave for being interpreted by a processing unit or providing an instruction or a data to a processing unit. A software may be dispersed in a computer system connected by a network to be stored or executed through a dispersed method.

A method according to an embodiment may be embodied as a form of a program instruction executable through various computer means to be stored in computer readable media. The computer readable media may include a program instruction, a data file, a data structure and a combination thereof. The program instruction recorded in the media may be designed and constituted specifically for an embodiment or may be well known to those skilled in a computer software to be usable. Examples of the computer readable media may include magnetic media such as a hard disk, a floppy disk, and a magnetic tape; optical media such as a CD-ROM and a DVD; magneto-optical media such as a floptical disk; and hardware equipments that are specially configured to store and perform a program instruction such as a ROM, a RAM, a flash memory, etc.

Although embodiments are illustrated with a limited number of embodiments and drawings, it will be apparent to those skilled in the art that various modifications and variations can be made from the above description. For example, a proper result may be obtained even when illustrated technologies are performed in an order different from the illustrated method and/or even when illustrated elements such as a system, a structure, a circuit, etc. are combined or mixed as a form different from the illustrated method or are substituted or replaced with different elements or equivalents.

Thus, it is intended that the present disclosure cover the modifications and variations of this disclosure provided they come within the scope of the appended claims and their equivalents.

What is claimed is:

1. A method of encoding an image using a depth information, comprising:
   extracting a depth value distribution information of a current largest coding unit (LCU);
   predicting a plurality of division structure candidates of the LCU based on the depth value distribution information; and
   determining an optimum division structure among the plurality of division structure candidates of the LCU based on at least one of coding efficiency and image quality,
   wherein predicting the plurality of division structure candidates of the LCU comprises determining that a coding unit (CU) included in the LCU is not divided when a size of the CU is greater than a predetermined value and when an encoding mode of the CU is a skip mode, and
   wherein predicting the plurality of division structure candidates of the LCU comprises verifying a depth value distribution information of the CU, verifying whether the CU is formed of a single object or not based on the depth value distribution information of the CU and ending prediction of the plurality of division structure candidates of the LCU when the CU is formed of the single object.

2. The method of claim 1, wherein the CU is judged to be formed of the single object when a difference between a maximum and a minimum of the depth value distribution information of the CU is equal to or smaller than a predetermined value.

3. The method of claim 1, wherein the CU is judged to be formed of the single object when a difference between a maximum and a minimum of depth values at four edge portions of the CU is equal to or smaller than a predetermined value.

4. The method of claim 1, wherein predicting the plurality of division structure candidates of the LCU includes determining whether the CU is divided or not based on the size of the CU, a difference between a maximum and a minimum of the depth value distribution information of the CU and the skip mode as an encoding mode of the CU.

5. The method of claim 4, wherein predicting the plurality of division structure candidates of the LCU includes determining that the CU is not divided when the size of the CU is equal to or greater than the predetermined value; when a difference between a maximum and a minimum of depth values at four edge portions of the CU is equal to or smaller than a predetermined value; and when the CU is encoded by the skip mode.

6. The method of claim 4, wherein predicting the plurality of division structure candidates of the LCU includes determining that the CU is not divided when the size of the CU is smaller than the predetermined value; when depth values at four edge portions of each of the LCU and the CU are a same as each other; when a size of a reference CU of the CU is greater than a predetermined value; and when the CU is encoded by the skip mode.

7. The method of claim 1, wherein an object structure of the CU is predicted based on the depth value distribution information and the optimum division structure is determined by omitting a part of rate-distortion calculations based on prediction of the object structure of the CU at determining the optimum division structure.

8. An apparatus of encoding an image using a depth information, comprising:
   a depth value extraction portion configured to extract a depth value distribution information of a current largest coding unit (LCU) from a depth image;
   a division structure prediction portion configured to predict a plurality of division structure candidates of the LCU based on the depth value distribution information; and
   an optimum division structure determination portion configured to determine an optimum division structure among the plurality of division structure candidates of the LCU based on at least one of coding efficiency and image quality,
   wherein the division structure prediction portion is further configured to determine that a coding unit (CU) included in the current LCU is not divided when a size of the CU is greater than a predetermined value and when an encoding mode of the CU is a skip mode, and
   wherein the division structure prediction portion is further configured to verify a depth value distribution information of the CU, verify whether the CU is formed of a single object or not based on the depth value distribution information of the CU and end prediction of the plurality of division structure candidates of the LCU when the CU is formed of the single object.

* * * * *